(12) United States Patent
Lesesky et al.

(10) Patent No.: US 7,497,529 B2
(45) Date of Patent: *Mar. 3, 2009

(54) SYSTEMS AND METHODS FOR MONITORING AND CONTROLLING TRACTOR/TRAILER VEHICLE SYSTEMS

(75) Inventors: Alan Lesesky, Charlotte, NC (US); Bobby Ray Weant, Rock Hill, SC (US)

(73) Assignee: Power Talk, Inc., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,325

(22) Filed: Apr. 21, 2006

(65) Prior Publication Data

US 2006/0192427 A1 Aug. 31, 2006

Related U.S. Application Data

(60) Continuation of application No. 10/957,563, filed on Oct. 1, 2004, now Pat. No. 7,059,689, which is a continuation of application No. 10/422,045, filed on Apr. 23, 2003, now Pat. No. 6,799,814, which is a continuation of application No. 09/970,872, filed on Oct. 3, 2001, now Pat. No. 6,582,033, which is a division of application No. 09/866,207, filed on May 26, 2001, now Pat. No. 6,378,959, which is a continuation of application No. 09/333,183, filed on Jun. 14, 1999, now Pat. No. 6,254,201, which is a division of application No. 08/976,391, filed on Nov. 21, 1997, now Pat. No. 6,127,939, which is a continuation-in-part of application No. 08/554,907, filed on Nov. 9, 1995, now abandoned, and a continuation-in-part of application No. PCT/US96/16580, filed on Oct. 14, 1996.

(51) Int. Cl.
*B60T 7/20* (2006.01)

(52) U.S. Cl. .................. 303/123; 340/3.1; 340/438

(58) Field of Classification Search ............ 303/7, 303/122.02, 122.05, 122.06, 122.08, 123, 303/124; 340/431, 438, 3.1, 825.36
See application file for complete search history.

(56) References Cited

U.S. PATENT DOCUMENTS 2,379,664 A 7/1945 Stanko (Continued)

FOREIGN PATENT DOCUMENTS

| EP | 0546370 A1 | 6/1993 |
| JP | 52-33092 | 3/1977 |
| WO | WO9412962 | 6/1994 |

OTHER PUBLICATIONS

Serial Data Communications Between Microcomputer Systems in Heavy Duty Vehicle Applications—SAE J1708 Jun. 1987.

(Continued)

*Primary Examiner*—Pam Rodriguez
(74) *Attorney, Agent, or Firm*—Moore & Van Allen, PLLC

(57) ABSTRACT

A status of one or more subsystems positioned on one or more trailers is communicated to a tractor electrically and mechanically connected to the trailer. The status may be automatically supplied by the subsystem or may be requested either by the operator of the tractor/trailer combination or automatically by another subsystem on either the tractor or the trailer. A spread spectrum data communications signal representing the status of a respective subsystem is superposed on the power bus. The status of the respective subsystem can then be determined from the spread spectrum data communications signal. Preferably, the status of the subsystem is indicated to an operator positioned on the tractor. A command for controlling a subsystem on a trailer can also be communicated from the tractor to the trailer over the power bus. A spread spectrum data communications signal representing the command is produced on the power bus, and the subsystem is controlled based on the spread spectrum data communications signal. Preferably, the command is received from an operator positioned in the tractor.

18 Claims, 23 Drawing Sheets

U.S. PATENT DOCUMENTS

| | | | |
|---|---|---|---|
| 2,483,815 A | 10/1949 | Easton | |
| 3,154,360 A | 10/1964 | Plishner | |
| 3,184,703 A | 5/1965 | Piscitello et al. | |
| 3,387,606 A | 6/1968 | Crafts et al. | |
| 3,705,986 A | 12/1972 | Sanders et al. | |
| 3,891,279 A | 6/1975 | Frait | |
| 3,916,313 A | 10/1975 | Lowry | |
| 3,997,889 A | 12/1976 | Sato et al. | |
| 4,041,470 A | 8/1977 | Slane et al. | |
| 4,104,630 A | 8/1978 | Chasek | |
| 4,207,468 A | 6/1980 | Wilson | |
| 4,236,255 A | 11/1980 | Burgeuer et al. | |
| 4,270,808 A | 6/1981 | Brearley | |
| 4,287,505 A | 9/1981 | Ohmori et al. | |
| 4,313,228 A | 1/1982 | Berstein | |
| 4,325,146 A | 4/1982 | Lennington | |
| 4,398,172 A | 8/1983 | Carroll et al. | |
| 4,624,472 A | 11/1986 | Stuart et al. | |
| 4,641,322 A | 2/1987 | Hasegawa | |
| 4,715,012 A | 12/1987 | Mueller, Jr. | |
| 4,733,919 A | 3/1988 | Jacobs et al. | |
| 4,735,461 A | 4/1988 | Moller et al. | |
| 4,752,899 A | 6/1988 | Newman et al. | |
| 4,767,181 A | 8/1988 | McEowen | |
| 4,772,209 A | 9/1988 | Muncey | |
| 4,804,938 A | 2/1989 | Rouse et al. | |
| 4,809,177 A | 2/1989 | Windle et al. | |
| 4,838,797 A | 6/1989 | Dodier | |
| 4,839,531 A | 6/1989 | Stemmons et al. | |
| 4,864,589 A | 9/1989 | Endo | |
| 4,897,642 A | 1/1990 | DiLullo et al. | |
| 4,926,170 A | 5/1990 | Beggs et al. | |
| 4,969,839 A | 11/1990 | Nilsson | |
| 5,025,253 A | 6/1991 | DiLullo et al. | |
| 5,090,024 A | 2/1992 | Vander Mey et al. | |
| 5,142,278 A | 8/1992 | Moallemi et al. | |
| 5,263,046 A | 11/1993 | Vander Mey | |
| 5,268,666 A | 12/1993 | Michel et al. | |
| 5,278,862 A | 1/1994 | Vander Mey | |
| 5,359,625 A | 10/1994 | Vander Mey et al. | |
| 5,397,924 A | 3/1995 | Gee et al. | |
| 5,442,810 A | 8/1995 | Jenquin | |
| 5,488,352 A | 1/1996 | Jasper | |
| 5,677,667 A | 10/1997 | Lesesky et al. | |
| 5,739,592 A | 4/1998 | Rigsby et al. | |
| 5,900,803 A | 5/1999 | Politz et al. | |
| 6,064,299 A | 5/2000 | Lesesky et al. | |
| 6,111,524 A | 8/2000 | Lesesky et al. | |
| 6,127,939 A * | 10/2000 | Lesesky et al. | 340/438 |
| 6,254,201 B1 * | 7/2001 | Lesesky et al. | 303/122.02 |
| 6,378,959 B2 * | 4/2002 | Lesesky et al. | 303/122.02 |
| 6,411,203 B1 | 6/2002 | Lesesky et al. | |
| 6,582,033 B2 * | 6/2003 | Lesesky et al. | 303/122.02 |
| 6,608,554 B2 | 8/2003 | Lesesky et al. | |
| 6,744,352 B2 | 6/2004 | Lesesky et al. | |
| 6,799,814 B2 * | 10/2004 | Lesesky et al. | 303/122.02 |
| 7,015,800 B2 | 3/2006 | Lesesky et al. | |
| 7,059,689 B2 * | 6/2006 | Lesesky et al. | 303/122.02 |

OTHER PUBLICATIONS

Sayegrih, et al., Transmission de données et d'informations intra-véhicule. Technique par étalement de spectra, *L'Onde Electrique,* May-Jun. 1993, vol. 73, N. 3, pp. 42-46 (including English translation).

Society of Automotive Engineers, Inc., SAE J560 Specification, Jun. 1993.

PCT International Search Report, PCT/US96/16580, Mar. 13, 1997.

Sales Brochure for Intellon captioned "Where the information highway meets the intelligent building Intellon's Spread Spectrum Carrier™ technology will be directing traffic."

System 86 Products Train Applications, Specification Manual, Morrison Knudsen Corporation Advanced Systems Division, pp. 2, 3, 13, 40.

IEEE Spectrum, vol. 31, No. 6, Jun. 1994, pp. 49-55.

Echelon's LonWorks Products Data Book, 1995-1996 Edition.

Echelon's LonWorks Custom Node Development, LonWorks Engineering Bulletin dated Apr. 1993.

"Communications Engineers Reference Book," edited by Fraidoon Mazda, Buttersworth-Heinemann, 1st Ed. 1993.

Deposition of Mr. Michael Van Schoiack and accompanying 38 exhibits thaken on Mar. 5, 2001, for a civil case in the U.S. District Court for South Carolina, Rock Hill Division, Civil Action No. 0:00-2568-19, *Vehicle Enhancement Systems, Inc.* v. *Intellon Corporation*.

Informational Video entitled "A Tractor-Trailer Communications Concept" displayed at an Information booth at the 1994 SAE International Truck & Bus Exposition held at the Washington State Convention Center in Seattle, Washington on Nov. 7-9, 1994.

\* cited by examiner

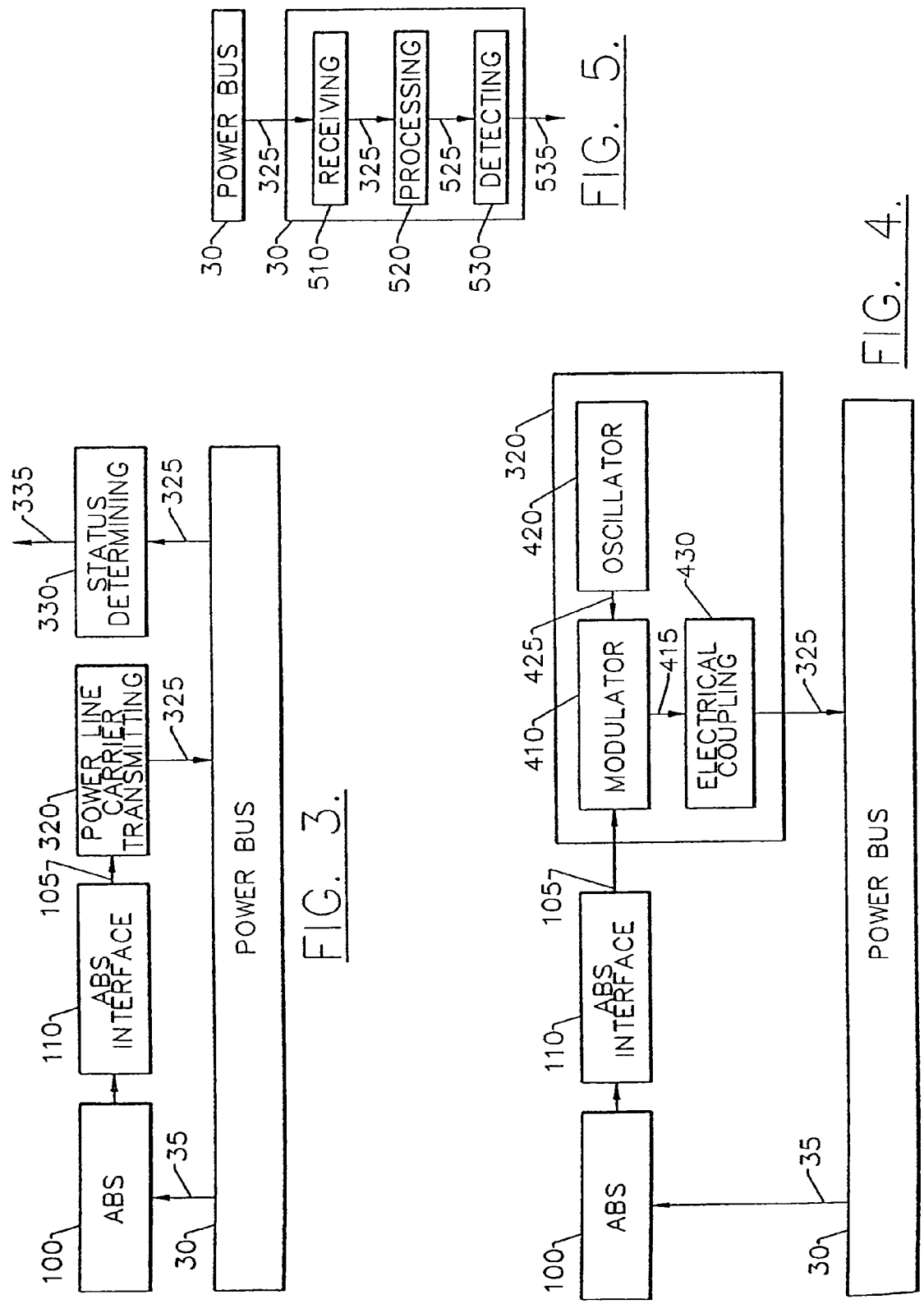

SYSTEMS AND METHODS FOR MONITORING AND CONTROLLING TRACTOR/TRAILER VEHICLE SYSTEMS

CROSS REFERENCE TO RELATED APPLICATIONS

This application is a continuation application of U.S. patent application Ser. No. 10/957,563, filed Oct. 1, 2004, now U.S. Pat. No. 7,059,689, which is a continuation application of U.S. patent application Ser. No. 10/422,045, filed Apr. 23, 2003, now U.S. Pat. No. 6,799,814, which is a continuation application of U.S. patent application Ser. No. 09/970,872, filed Oct. 3, 2001, now U.S. Pat. No. 6,582,033, which is a divisional application of U.S. patent application Ser. No. 09/866,207, filed May 26, 2001, now U.S. Pat. No. 6,378,959, which is a continuation application of U.S. patent application Ser. No. 09/333,183, filed Jun. 14, 1999, now U.S. Pat. No. 6,254,201, which is a divisional application of U.S. patent application Ser. No. 08/976,391, filed Nov. 21, 1997, now U.S. Pat. No. 6,127,939, which is a continuation-in-part application of U.S. patent application Ser. No. 08/554,907, filed Nov. 9, 1995, now abandoned and of International Patent Application No. PCT/US96/16580, filed Oct. 14, 1996, the entire contents of all of which are incorporated herein by reference.

FIELD OF THE INVENTION

This invention relates generally to data communications with a trailer and, more specifically, to data communications systems and methods for monitoring and controlling subsystems on a trailer.

BACKGROUND OF THE INVENTION

The trucking industry has for many years used tractor/trailer combinations to transport cargo over the roadways to intended destinations. As shown in FIG. 1, tractor 10 and trailer 20 are mechanically coupled together so that the tractor can pull the trailer with its cargo in an efficient and cost effective manner. Various links between the tractor and the trailer provide vehicle subsystems with power and/or control signals to operate. Hydraulic, pneumatic, electrical and other subsystems on the tractor/trailer combination have associated electrical conductors and pneumatic lines running therebetween so these subsystems can operate. With respect to electrical subsystems, a tractor/trailer combination typically includes a tractor 10 and trailer 20 and a power bus 30 electrically connected to one or more batteries 32, which are typically charged by an alternator 34 mechanically driven by a tractor engine 15. Thus, electrical power is distributed from tractor 10 to subsystems in trailer 20.

The trucking industry has historically lagged behind other industries with respect to technological innovation, but recently has been incorporating more and more sophisticated electronic subsystems in both tractors and trailers. For example, regulatory changes arising from safety concerns have led to the incorporation of trailer antilock braking systems (ABS), frequently microprocessor-controlled, in trailers in order to minimize the risk of trailer skids and jackknifing. New trailers are being constructed with ABS, while older trailers are being retrofitted to incorporate ABS. These systems may include, for example, actuators and transducers operatively connected to the trailer wheels and braking hardware, controlled by electronic circuits located elsewhere on the trailer and tractor. As shown in FIG. 1, an antilock braking system 100, as well as other subsystems, conventionally receives electrical power from power bus 30.

Antilock braking systems may produce data signals which indicate various conditions of the ABS. These data signals may include, for example, a failure warning signal which is asserted if an ABS microprocessor detects a failure within itself or other components of the ABS. In some applications, a data signal may drive a light-emitting diode (LED) or other indicator. Conventionally, the tractor/trailer operator has no external indication of the state of the ABS. Even those systems having an external indicator may not allow a tractor/trailer operator to inspect the state of the ABS while positioned in the tractor cab with the tractor/trailer combination in operation. The operator typically may have to park the vehicle, exit the cab, and inspect an ABS indicator on the trailer, if present, in order to monitor the state of the ABS. Thus, it may be difficult for the operator to monitor the state of the ABS system while the vehicle is moving.

It may be possible to wire data signals from an ABS to a tractor using a dedicated signal path such as a twisted wire pair passed from the trailer to the tractor. A seven-pin connector has been widely used by the trucking industry to convey electrical power for lighting and equipment operation between a tractor and a trailer. As shown in FIG. 2, the connector 40 includes two disengageable connector portions 50 and 60 to permit the tractor and trailer combination to be disconnected. An example of such a seven-pin connector is illustrated in U.S. Pat. No. 4,969,839 to Nilsson, the entire disclosure of which is specifically incorporated herein by reference. These seven-pin connectors are well known and have been specified by the Society of Automotive Engineering (SAE) according to the standard number "SAE J560", the teachings of which are also incorporated herein by reference.

Each of the sockets 54 in the standard seven-pin connector (SAE J560) is an electrical conductor carried by the plug portion 50 of the connector and which is adapted to mate with a corresponding electrical pin 63, also an electrical conductor, in the receptacle portion 60 of the connector to thereby provide an electrical signal between the tractor and the trailer. The pins and corresponding sockets generally are assigned to specific electrical subsystems, for example, power, ground, turn signals, brake lights, clearance lamps, emergency flashers, and other devices requiring electrical signals.

Until recently, the seventh pin on the connector has been an "auxiliary" pin which could be used for specific electrical purposes or applications on individual tractor/trailer combinations. Pursuant to Federal Motor Vehicle Safety Standard No. 121, however, the National Highway Traffic Safety Administration has mandated that the antilock braking systems of all trailers on the road after Mar. 1, 1998 must not only be powered by the power line that drives the brake lights, but also by a second power line that is connected to the tractor by means of the seventh pin, i.e., the former auxiliary pin. As a result, all seven pins of the connector will soon be dedicated to a particular purpose.

Although pins and sockets of the seven-pin connector may be used to convey an ABS status signal to a tractor, the generally limited circuit capacity afforded by the standardized connector would be reduced even further. The standard seven-pin connector simply may not provide the circuit capacity needed to convey to a tractor an increased number of data signals from various systems located on trailers, including additional ABS systems which may be present when a tractor is connected to multiple trailers. Connectors with greater capacity could be employed, but the seven-pin connector (SAE J560) is an industry standard for tractor/trailers.

Alternative communications techniques such as fiber optic links or radio communication through free space may bypass the bottleneck of limited channel capacity in the standard connectors used to connect tractors and trailers, but may require the installation of complex and expensive electronic components. These components, often referred to as "black boxes," may be vulnerable to theft and vandalism when placed on trailers which often are under the control of multiple operators and left in unsecured areas.

SUMMARY OF THE INVENTION

In view of the foregoing, it is therefore an object of the present invention to provide systems and methods for data communications in a tractor and/or a trailer.

It is another object of the present invention to provide data communications systems and methods which utilize existing wiring on tractors and trailers.

It is another object of the present invention to provide data communications systems and methods that are also compatible with standardized connectors widely used in the trucking industry.

It is another object of the present invention to provide data communications systems which are less-sensitive to the interference and noise frequently present in tractor and trailer electrical systems.

It is another object of the present invention to provide systems and methods for monitoring a warning system of a tractor/trailer combination.

It is another object of the present invention to provide systems and methods for monitoring an antilock braking system of a tractor/trailer combination by a tractor/trailer operator positioned in a cab of a tractor.

It is another object of the present invention to provide systems and methods for monitoring an antilock braking system which allow a trailer equipped with elements of an antilock braking system monitoring system to be used with a tractor which is not equipped with complementary elements while still providing an indication of a status of the antilock braking system to a tractor/trailer operator positioned within the tractor cab.

It is another object of the present invention to provide systems for monitoring an antilock braking system in a tractor/trailer combination using components packaged to be inconspicuous and less vulnerable to theft and vandalism.

It is another object of the present invention to reliably communicate with a number of subsystems positioned on one or more trailers.

These and other objects, features and advantages of the present invention are provided according to one embodiment by systems and methods for communicating antilock braking signals to a status indicator via the power bus which distributes power to the antilock braking system. Thus, a vehicle according to the embodiment includes a tractor connected to a trailer having an antilock braking system and an antilock braking system interface which produces a data signal, typically representing the status of the antilock braking system. The vehicle also has an ABS reporting system that receives the data signal and includes power line carrier communicating means, responsive to the antilock braking system, that produces a data communications signal representing the status of the antilock braking system over the power bus. The vehicle of this embodiment also includes status determining means for determining the status of the antilock braking system from the data communications signal. The status determining means preferably includes an indicator which indicates the determined status to a tractor/trailer operator positioned within the cab of the tractor.

The present invention provides for remote monitoring an antilock braking system by a tractor/trailer operator. Thus, the present invention allows a tractor/trailer operator to monitor an antilock braking system while the operator is positioned in the tractor cab and the tractor/trailer combination is in motion. The present invention also provides for monitoring of the status of an antilock braking system without requiring extensive rewiring of the tractor or the trailer. Furthermore, the present invention provides for monitoring of an antilock braking system using existing power wiring and connectors.

According to one embodiment, the power line carrier communicating means may include a waveform generator, preferably an oscillator, which produces a power line carrier signal having a predetermined carrier frequency. A modulator is responsive to the waveform generator and the antilock braking system and produces the data communications signal from the power line carrier signal and the data signal. Coupling means couples the modulator to the power bus and superposes the data communications signal on the power bus.

The status determining means may include power line carrier receiving means that is responsive to the power bus and receives the data communications signal. Processing means is responsive to the power line carrier receiving means and produces a data-modulated digital carrier signal from the received data communications signal. Detecting means detects a status of the antilock braking system from a count of the transitions of the data-modulated digital carrier signal occurring during a predetermined time interval. The status determining means may also include an indicator for indicating the determined status to a tractor/trailer operator positioned within a cab of the tractor, thus informing the operator of the condition of the antilock braking system while the tractor/trailer combination is in operation. The indicator may be in the form of lights, gauges, images on a CRT screen, audible annunciators and the like, as would be readily understood by those skilled in the art.

The power bus may include a plurality of tractor power lines and trailer power lines electrically connected by a connector. The connector may include an industry-standard SAE J560 connector. Thus the present invention provides for monitoring of an antilock braking system using existing wiring and connectors.

According to one advantageous embodiment, the power bus also includes a first capacitor disposed between at least two of the tractor power lines and a second capacitor disposed between at least two of the trailer power lines. By placing the data communications signal on one of the capacitively coupled power lines, the data communications signal is transmitted via each of the capacitively coupled conductors. As a result, the communications system of this embodiment provides redundancy.

In another aspect of the present invention, the power line carrier communicating means may be integrated with a warning indicator in a trailer warning indicator package. The warning indicator is responsive to the antilock braking system interface and indicates a status of the antilock braking system from the data signal. The trailer warning indicator package includes means for mounting the trailer warning indicator package so that it is positioned on the trailer and is viewable by a tractor/trailer operator positioned within the tractor cab. Thus, a trailer which incorporates the power line carrier communicating means of an antilock braking system according to the present invention may be used with a tractor which is not equipped with the complementary status determining means, while still providing a way to indicate a status of the trailer antilock braking system to a tractor/trailer operator positioned within the tractor cab. The trailer warning indicator package preferably has a standard form factor, such as that of the standard running lights commonly used on trailers, thereby providing components of an antilock braking system monitoring system which are inconspicuous and less susceptible to vandalism and theft.

According to another aspect of the present invention, a communications system for communicating the status of a subsystem positioned on a trailer to a tractor is provided that includes a power bus which supplies electrical power to the combination of the tractor and the trailer, and spread spectrum signal producing means, responsive to the subsystem and positioned on the trailer, for producing a spread spectrum data communications signal representing the status of the subsystem on the power bus. For example, the subsystem may produce a status signal representing a status of the subsystem, and the spread spectrum signal producing means may include means for producing the spread spectrum data communications signal from the status signal. Status determining means, positioned on the tractor, is responsive to the power bus for determining the status of the subsystem from the spread spectrum data communications signal. The status determining means may include spread spectrum signal receiving means, positioned on the tractor and responsive to the power bus, for receiving the spread spectrum data communications signal, and means, positioned on the tractor and responsive to the spread spectrum signal receiving means, for determining the status of the subsystem from the received spread spectrum data communications signal. The status determining means also preferably includes an indicator, such as an alphanumeric display, an LED display, or an audio annunciator, which indicates a status of the subsystem to an operator positioned in the tractor.

According to another aspect, a communications system is provided for permitting a tractor and a trailer mechanically and electrically connected to the tractor to communicate a command from the tractor to a subsystem positioned on the trailer. According to this embodiment, the communications system includes a power bus which supplies electrical power to the combination of the tractor and the trailer, spread spectrum signal producing means, positioned on the tractor, for producing a spread spectrum data communications signal representing the command on the power bus, and controlling means, positioned on the trailer, for controlling the subsystem based on the spread spectrum data communications signal. The controlling means preferably includes spread spectrum signal receiving means, positioned on the trailer and responsive to the power bus, for receiving the spread spectrum data communications signal, and means for controlling the subsystem from the received spread spectrum data communications signal. The system also preferably includes operator input means for receiving a command from an operator positioned on the tractor, such as via a switch mounted on an instrument cluster in the tractor.

Thus, the communications system of the present invention can provide commands to the various subsystems on the trailer. These commands may be provided by the operator of the tractor/trailer combination or may be automatically generated, such as according to a predetermined schedule or in response to a particular event. Among other things, the command may request that one or more subsystems provide status or other data. In addition to responding to commands, the subsystems themselves may initiate communications, such as with other subsystems in the trailer or tractor, if so desired.

According to the present invention, a communications module designed to be mounted to a trailer can communicate via a power bus and includes a status signal input and a command signal output. The communications module includes spread spectrum signal producing means, responsive to the status signal input, for producing a spread spectrum data communications signal from a status signal provided at the status signal input. The spread spectrum signal producing means is coupled to the power bus such that the spread spectrum data communications signal is superposed on the power bus. The communications module also includes spread spectrum signal receiving means for receiving a spread spectrum communications signal superposed on the power bus and for producing a command signal at the command signal output from the received spread spectrum communications signal. The communications module also preferably includes a communications module housing which houses the spread spectrum signal receiving means and the spread spectrum signal producing means. Typically, the communications module housing is mounted to the trailer.

Likewise, one embodiment of the present invention also provides a communications module designed to be mounted within the tractor that communicates via the power bus and which includes a command input. The communications module of this embodiment also includes spread spectrum signal producing means, responsive to the command input, for producing a spread spectrum data communications signal from a command provided at the command input. The spread spectrum signal producing means is coupled to the power bus such that the spread spectrum data communications signal is superposed on the power bus. The communications module also includes spread spectrum receiving means for receiving a spread spectrum data communications signal superposed on the power bus that typically represents the status of a respective subsystem. The communications module also preferably includes status determining means, responsive to the spread spectrum receiving means, for determining the status of the subsystem from the received spread spectrum data communications signal. In this regard, the status determining means preferably includes an indicator which indicates the status of the subsystem The communications module also preferably includes operator input means for receiving a command from an operator, such as via a switch. The communications module also preferably includes a communications module housing which houses the spread spectrum signal producing means, the spread spectrum signal receiving means, the indicator and the operator input means, and means for mounting the communications module on the tractor such that the indictor is viewable by and the operator input means is accessible to an operator positioned in the tractor.

The power bus may oftentimes supply power to a number of subsystems on one or more trailers. According to one particularly advantageous embodiment, the communications system is designed to communicate or otherwise broadcast the respective status of each of the plurality of subsystems positioned on at least one trailer to the tractor even though the subsystems communicate according to at least two different protocols. For example, the subsystems can include an antilock braking system that communicates according to a J-1708 protocol and a refrigeration unit that communicates according to an RS-232 protocol. According to this embodiment, the spread spectrum signal producing means preferably includes a plurality of protocol specific transmitters associated with respective ones of the subsystems. Each protocol specific transmitter receives signals from the respective subsystem that have a predetermined protocol and converts the signals to a standardized format. For example, the protocol specific transmitters can include an RS-485 transceiver associated with an antilock braking system for receiving J-1708 signals and an RS-232 transceiver associated with a refrigeration unit for receiving RS-232 signals. The spread spectrum signal producing means of this embodiment also preferably includes means for producing spread spectrum data communications signals representative of the status of respective ones of the subsystems based upon the standardized signals that are provided by the protocol specific transmitters. Based upon the spread spectrum data communications signals, the status determining means of the communications system of this is embodiment can determine the status of respective ones of the subsystems.

In one embodiment, the protocol specific transmitters are protocol specific transceivers. As such, the protocol specific transceivers preferably include means for determining the state of the respective transceiver such that signals transmitted by the protocol specific transceiver are not also received and processed by the protocol specific transceiver.

According to another embodiment of the communications system that communicates the respective status of each of a plurality of subsystems positioned on at least one trailer to the tractor, the spread spectrum signal producing means includes a plurality of spread spectrum transmitters responsive to respective ones of the subsystems for producing spread spectrum communications signals representing the status of the respective subsystems. The spread spectrum signal producing means of this embodiment preferably includes self-diagnostic means for monitoring the signals provided to the spread spectrum transmitter by the protocol specific transmitters and for halting further transmission by the spread spectrum signal producing means to the communications system if the self-diagnostic means determines that the signals provided to the spread spectrum transmitters are inaccurate or otherwise includes errors. As a result, the remainder of the communications system can continue to operate as designed without being corrupted by inaccurate signals.

In order to permit the communications system of the present invention to effectively broadcast a spread spectrum data communications signal representing the status of a first subsystem on the power bus, the communications system of one advantageous embodiment further includes spread spectrum blocking means associated with respective ones of the other subsystems. The spread spectrum blocking means protect the spread spectrum data communications signal placed on the power bus by the spread spectrum signal producing means from attenuation by the other subsystems. In one embodiment, the spread spectrum blocking means includes a plurality of inductive elements associated with respective ones of the other subsystems. Alternatively, the spread spectrum blocking means can include a plurality of ferrite beads associated with respective ones of the other subsystems. In either embodiment, the spread spectrum blocking means is designed to prevent or at least significantly reduce the filtering or other attenuation of the spread spectrum data communications signals by the other subsystems electrically connected to the power bus. As such, the status determining means of the communications system can receive and process a spread spectrum data communications signal without concern that the spread spectrum data communications signal has been significantly attenuated or otherwise distorted by the other subsystems.

The power bus also typically supplies electrical power to a plurality of electrical loads within the tractor. In order to prevent attenuation or other distortion of the spread spectrum data communications signals by the plurality of other electrical loads within the tractor, the spread spectrum signal producing means is preferably electrically connected to a conductor of the tractor power lines at a point nearer the connector than the respective points at which the plurality of electrical loads are electrically connected to the power bus. More particularly, the communications system of this embodiment can include a capacitor disposed between the spread spectrum signal producing means and the respective tractor power line to couple the spread spectrum data communications signal to the respective tractor power line.

Monitoring methods according to the present invention are used for monitoring a subsystem, such as an antilock braking system, of a tractor/trailer combination. These methods include the following steps: a data signal, such as a status signal, is provided by the subsystem; a data communications signal is produced from the data signal; the data communications signal is communicated over a power bus; and the status of the subsystem, such as the antilock braking system, is determined from the data communications signal. The step of communicating may include steps of modulating the data signal with a signal having either a predetermined carrier frequency or a predetermined spectrum of carrier frequencies to produce the data communications signal and superposing the data communications signal on the power bus. The step of determining may include the step of indicating the determined status of the antilock braking system to a tractor/trailer operator positioned within a cab of the tractor.

A method for determining the status of an antilock braking system from a data communications signal representing the status of the antilock braking system is also provided by the present invention. The method includes the steps of: receiving a data communications signal representing one status of a subsystem, such as the antilock braking system; producing a data-modulated digital carrier signal from the received data communications signal; and detecting a status of the subsystem, such as the antilock braking system, from a count of transitions of the data-modulated digital carrier signal occurring during a predetermined time interval.

BRIEF DESCRIPTION OF THE DRAWINGS

Some of the objects and advantages of the present invention having been stated, others will be more fully understood from the detailed description that follows and by reference to the accompanying drawings in which:

FIG. 3 is a schematic diagram illustrating an antilock braking system monitoring system according to an embodiment of the warning system of the present invention;

FIG. 4 is a block diagram illustrating power line carrier communicating means according to the present invention;

FIG. 5 is a block diagram illustrating status determining means according to the present invention;

DETAILED DESCRIPTION OF THE PREFERRED EMBODIMENTS

Figure 1:
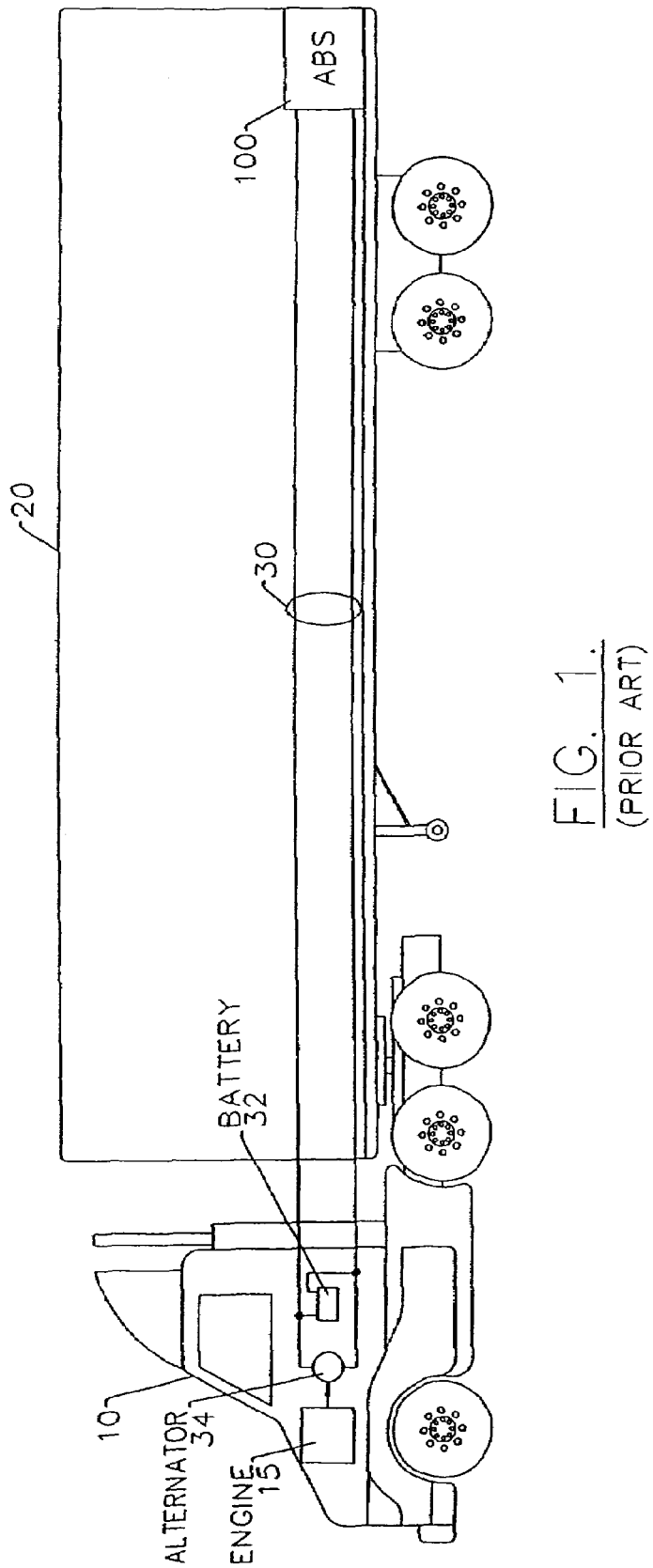
FIG. 1 is a schematic diagram illustrating a combination tractor/trailer as in the prior art.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

The communications system of the present invention will be hereinafter described in conjunction with communications between a tractor 10 and a trailer 20 and, in particular, with communications involving an antilock braking system on the trailer. However, the communications system of the present invention can be employed with other subsystems on a tractor and/or a trailer if so desired. In addition, the communications system of the present invention can provide communications with the various electrical subsystems of a trailer in instances in which the trailer is not mechanically and electrically coupled to a tractor, such as instances in which the trailer is primarily serving as a container. For example, the communications system of the present invention can provide communications with the various subsystems on the trailer in instances in which the trailer is being carried aboard a railcar, a ship or the like, without departing from the spirit and scope of the present invention.

FIG. 3 illustrates an antilock braking system monitoring system according to the present invention. The antilock braking system 100 receives electrical power 35 from the power bus 30. An antilock braking system interfaces 110, responsive to the antilock braking system 100, produces a data signal 105 representing a status of antilock braking system 100. Data signal 105 may be a binary signal representing an either/or condition of the antilock braking system 100 such as failed/operational, active/standby, and the like. As many antilock braking systems employ microprocessor-based controllers, the antilock braking system interface may be located within the antilock braking system 100 and the data signal 105 may be a digital signal produced by the antilock braking system controller. It will be understood by those skilled in the art that various forms of antilock braking system interface 110 may be used with the present invention, such as relays or switches electrically connected to control signals of antilock braking system 100, transducers mechanically or electrically connected to components of antilock braking system 100, and the like. The data signal 105 may be digital as described above, or may be an AC or DC analog signal, the amplitude, frequency and other parameters of which may provide information.

The power line carrier communicating means 320 is responsive to antilock braking system interface 110 and produces the data communications signal 325 superposed on power bus 30. As illustrated in FIG. 4, the power line carrier communicating means 320 preferably includes a modulator 410 which modulates a carrier signal 425, produced by a waveform generator 420 which may be an oscillator, with data signal 105. Electrical coupling means 430 couples the modulator 410 to the power bus 30, superposing the data communications signal 325, in the form of a data-modulated carrier signal, on the power bus 30.

Power line carrier techniques for superposing a modulated carrier signal on a power bus and receiving the superposed signal from the power bus are known for other applications. It will be understood by those skilled in the art that the modulator 410 may perform amplitude modulation, frequency modulation, phase modulation and other modulation functions. It will also be understood that the electrical coupling means 430 may utilize inductive coupling, capacitive coupling, a combination of inductive and capacitive coupling, and other methods to superpose the data communications signal 325 on the power bus 30. It will be understood by those skilled in the art that superposing refers to any linear or nonlinear combination of signals in transmission media such as wires, busbars, and the like.

Figure 6:
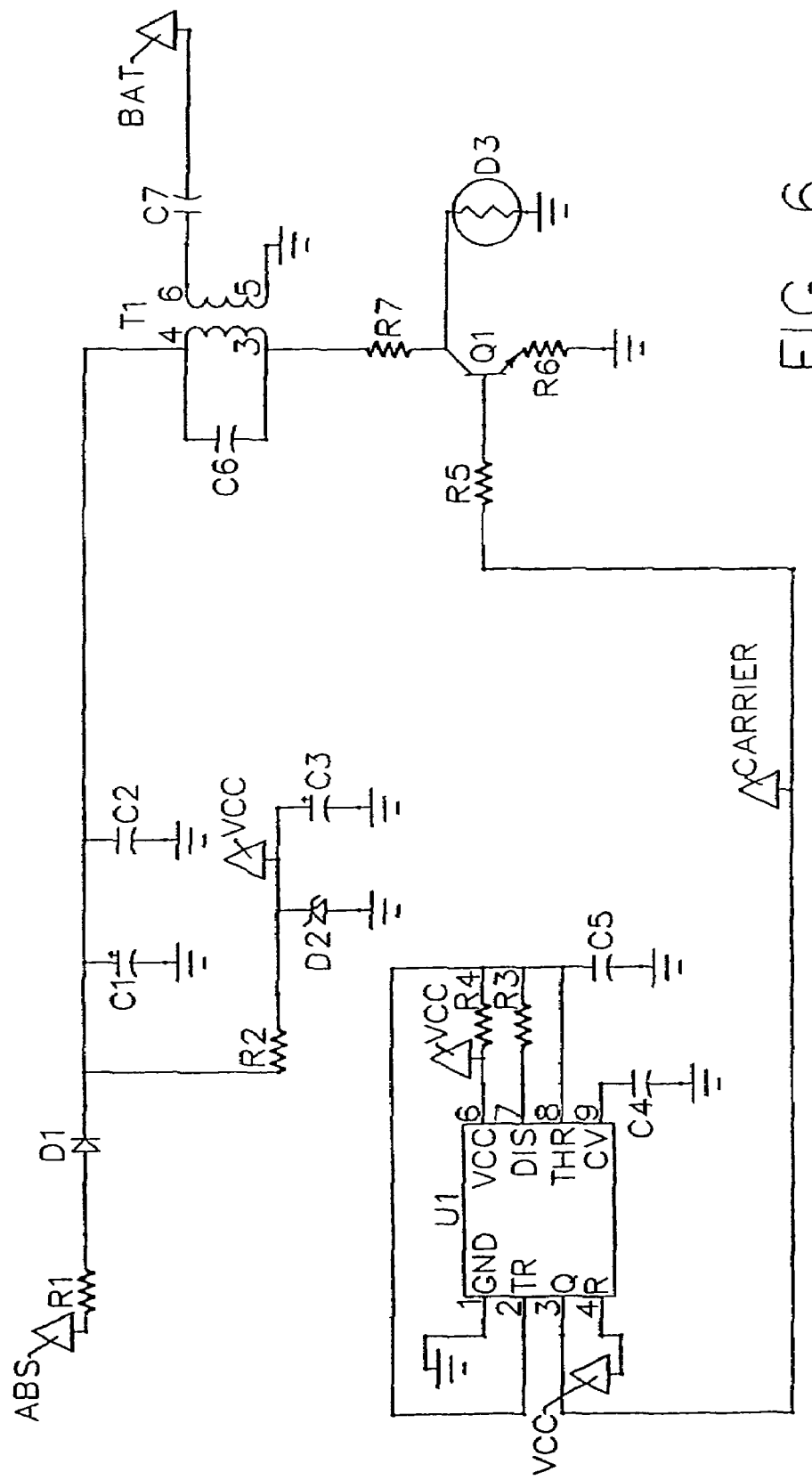
FIG. 6 is an electrical schematic diagram illustrating an electrical circuit for communicating a data communications signal over a power bus according to the present invention.

FIG. 6 is an electrical schematic diagram of an exemplary embodiment according to the present invention, illustrating an electrical circuit which performs functions of the power line carrier communicating means 320. For example, an LM555 timer IC U1 preferably produces a carrier signal having a predetermined frequency such as approximately 125 kHz at a carrier signal output node CARRIER when the voltage at an input node ABS, where the data signal 105 is input, is above a predetermined level, preferably approximately 12 volts. The signal at the carrier signal output node CARRIER drives the base of transistor Q1. This induces a sinusoidal current between terminals 5,6 of a transformer T1 which is capacitively coupled through a capacitor C7 to a power bus 30 present at a power bus output node BAT. Thus, modulation of the carrier signal at the carrier signal output node CARRIER by the data signal 105 at the input node ABS is effected, producing the data communications signal 325 superposed on the power bus 30.

It will be understood by those skilled in the art that the power line carrier communicating means 320 may be implemented using various circuits and techniques. For example, the power line carrier communicating means 320 may perform signal processing on the data signal 105 or combine the data signal 105 with other signals in an encoded data stream which is used to modulate a carrier signal and superposed on the power bus 30. The waveform generator 420 may be integrated into the antilock braking system 100 or another electronic system present on the tractor or trailer. The ABS system 100 may also be a pressure monitoring system, a temperature monitoring system, or other subsystem so that the status of the system is indicated or warned to others such as an operator positioned in the cab of a tractor. In the embodiment illustrated in FIG. 6 the data signal 105 present at the input node ABS corresponds to a voltage supplied by the antilock braking system interface 110, but it will be understood that the data signal 105 may be coupled into modulator 420 in various other ways, such as optical and magnetic coupling.

It will be understood by those skilled in the art that power line carrier communicating means 320 may be centralized or distributed. It will also be understood that power line carrier communicating means 320 may include other means for processing data signal 105, such as signal processing or coding functions implemented using special purpose hardware or a combination of special purpose hardware and general purpose hardware running software. Preferably, the power line carrier communicating means 320, however, includes means for communicating data, which may include a modulator, over a predetermined spectrum of frequencies such as illustrated by the spread spectrum technology embodied in the integrated circuits and components (i.e., Intellon SSC PLCEFN, XCR38149PRO2, QHCK-9409 integrated circuit or CEBus-compliant communications modules according to EIA RS-232 and ISA bus module standards) of the Intellon Spread Spectrum Carrier of the Intellon Corporation of Ocala, Fla. which are hereby incorporated herein in its entirety by reference. As described in detail below, a spectrum (e.g., 100-400 KHz) of frequencies for data communications allows the signal to be communicated in a manner over the power line which significantly reduces the interference or suppression of the received signal by other electromechanical systems in the tractor such as the alternator.

Figure 10:
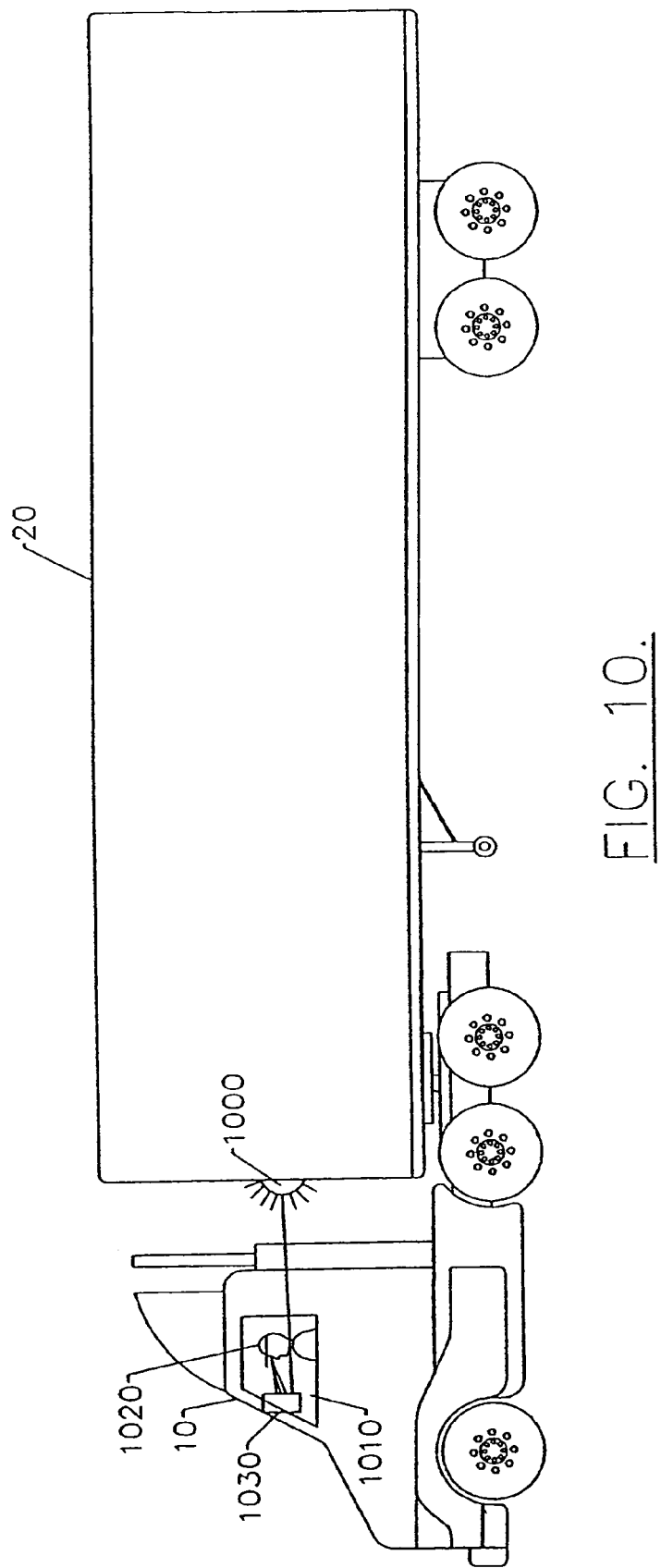
FIG. 10 is a schematic diagram illustrating a tractor/trailer combination with a warning indicator according to the present invention.
Figure 11:
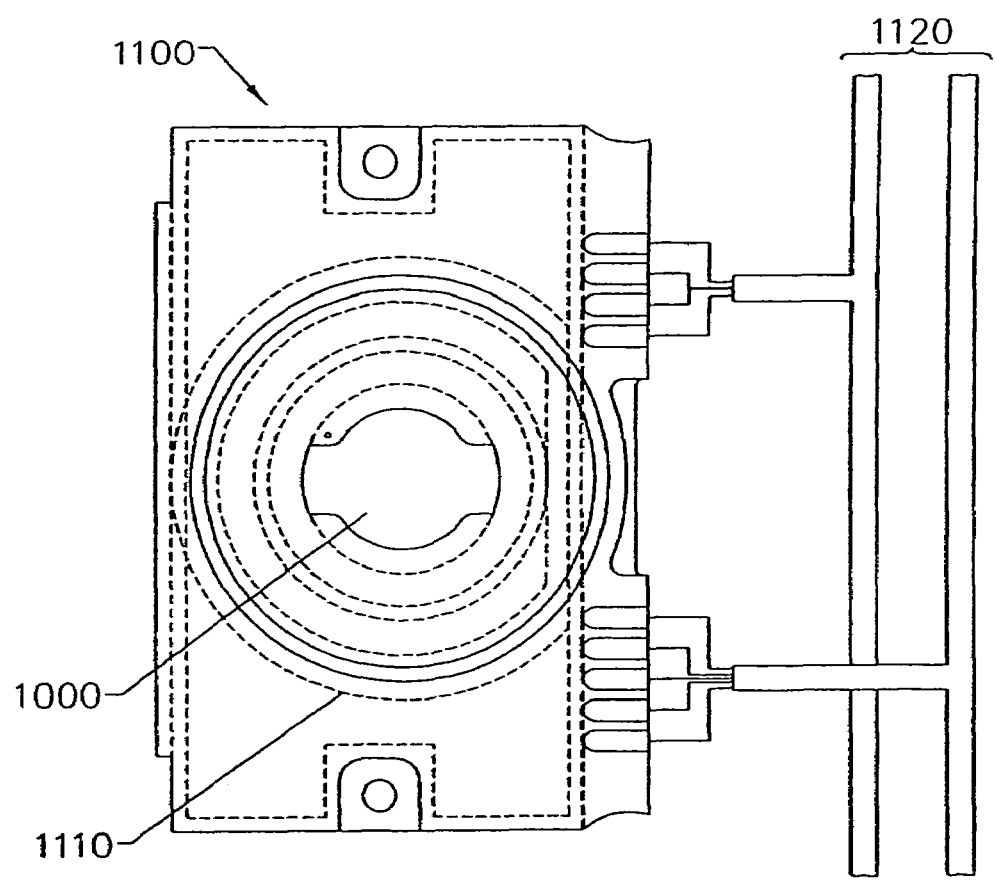
FIG. 11 is a schematic diagram illustrating an intelligent warning indicator according to the present invention.

An antilock braking system monitoring system according to the present invention may also include a warning indicator 1000 as shown in FIGS. 10 and 11. The warning indicator 1000 preferably is packaged with power line carrier transmitter means 320 in a trailer warning indicator package 1100, producing an "intelligent warning indicator" as illustrated in FIG. 11. The trailer warning indicator package 1100 is positioned on trailer 20 so that the warning indicator 1000 is visible to a tractor/trailer operator 1020 positioned within a tractor cab 1010, as shown in FIG. 10, thus providing a way to indicate a status of the antilock braking system 100 to a tractor/trailer operator even if the tractor 10 is not equipped with status determining means 330. For example, the trailer warning indicator package 1100 can include means, such as a mounting flange with holes drilled therein, for mounting the indicator package to the trailer. Preferably, the warning indicator 1000 is powered by the data signal 105, but it will be understood by those skilled in the art that the warning indicator 1000 may be directly actuated by the data signal 105 or indirectly actuated by such devices as relays, lamp drivers and the like. The trailer warning indicator package 1100 also preferably has an inconspicuous standard form factor, such as that used for the running lights commonly used on trailers, to thereby reduce the risk of vandalism or theft.

Referring again to FIG. 3, status determining means 330 determines a status 335 of antilock braking system 100 from the data communications signal 325 superposed on the power bus 30 by the power line carrier communicating means 320. As shown in FIG. 5, the status determining means 330 preferably includes power line carrier receiving means 510 for receiving the data communications signal 325 from the power bus 30, processing means 520 for producing a data-modulated digital carrier signal 525 from the received data communications signal 325, and detecting means 530 for detecting a status 535 of the antilock braking system 100 from transitions of data-modulated digital carrier signal 525. It will be understood by those skilled in the art that the status determining means 330, processing means 520 and detecting means 530 may be centralized or distributed. The status determining means 330, processing means 520 and detecting means 530 may also be implemented using special purpose hardware or a combination of special purpose hardware and general purpose hardware running software.

Figure 7:
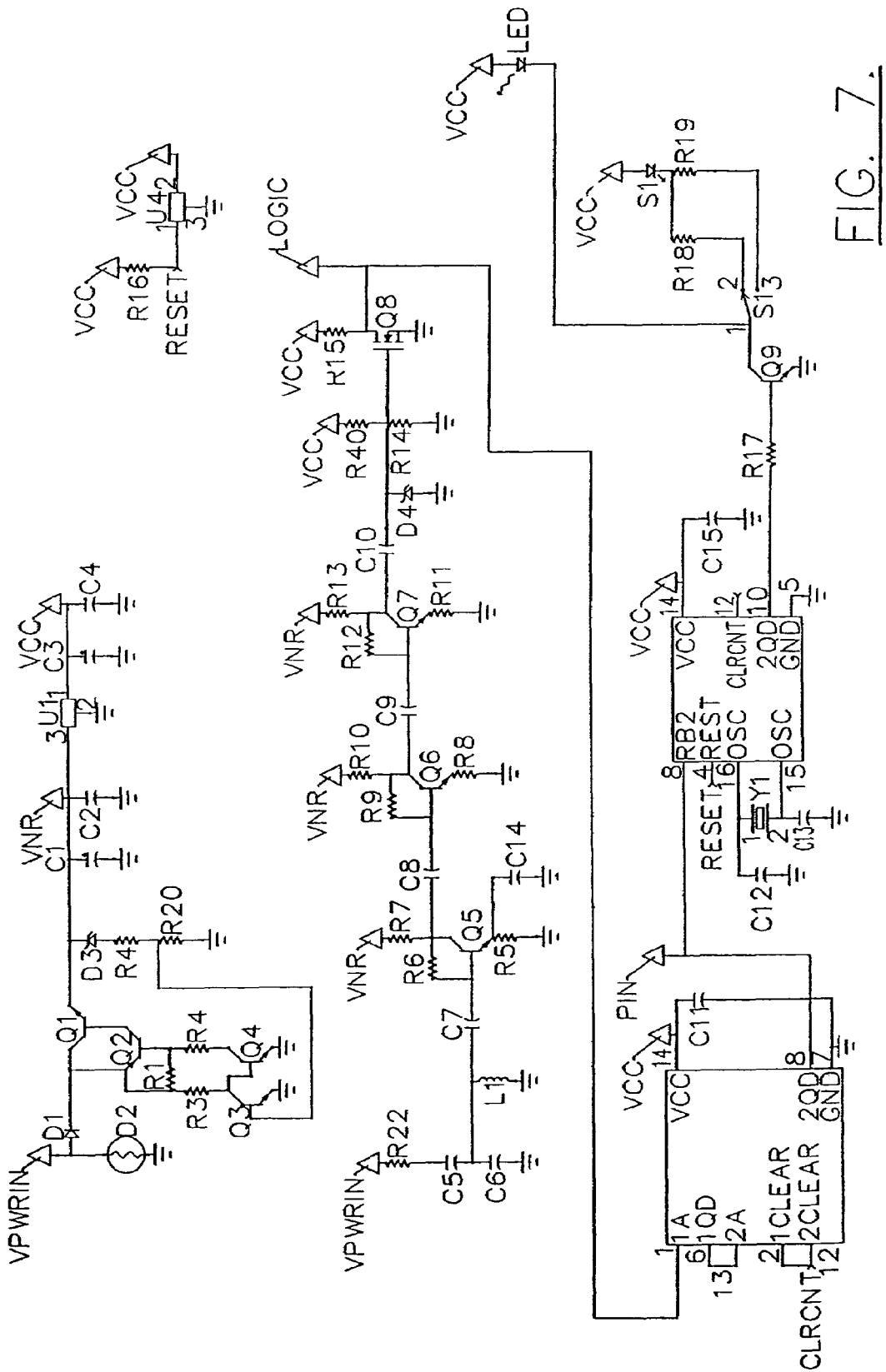
FIG. 7 is an electrical schematic diagram illustrating an electrical circuit for determining a status of an antilock braking signal from a data communications signal received from a power bus according to an embodiment of a warning system of the present invention.

FIG. 7 is an electrical schematic diagram of an exemplary embodiment according to the present invention, illustrating an electrical circuit which performs functions of status determining means 330. Data communications signal 325, here an amplitude-modulated signal produced by a power line carrier communicating circuit of the type shown in FIG. 5, is received by the power line carrier receiving means as illustrated by the resonant tank circuit including capacitors C5 and C6 and inductor L1 from power bus 30 present at a power bus input node VPWRIN. The received signal is capacitively coupled through capacitor C7 into multistage level-changing and shaping circuits including transistors Q5-Q8. As will be understood by those skilled in the art, these circuits produce a first data-modulated digital carrier signal at a first digital carrier signal output node LOGIC with the same carrier frequency as the received data communications signal 325.

In the illustrated embodiment, the first data-modulated digital carrier signal at the first digital carrier signal output node LOGIC is then divided in counter IC U2 to produce a second data-modulated digital carrier signal at a second digital carrier signal output node PIN which has a carrier frequency $1/128$th of the first data-modulated digital carrier signal at the second node LOGIC. The second data-modulated digital carrier signal is then input into a programmable controller IC U3 having operating software which counts transitions of the second data-modulated digital carrier signal, illuminating an external light-emitting diode (LED) LED if the number of transitions occurring in the second data-modulated digital carrier signal occurring during a predetermined time interval is above a predetermined threshold, indicating a state of data signal 325.

Figure 8A:
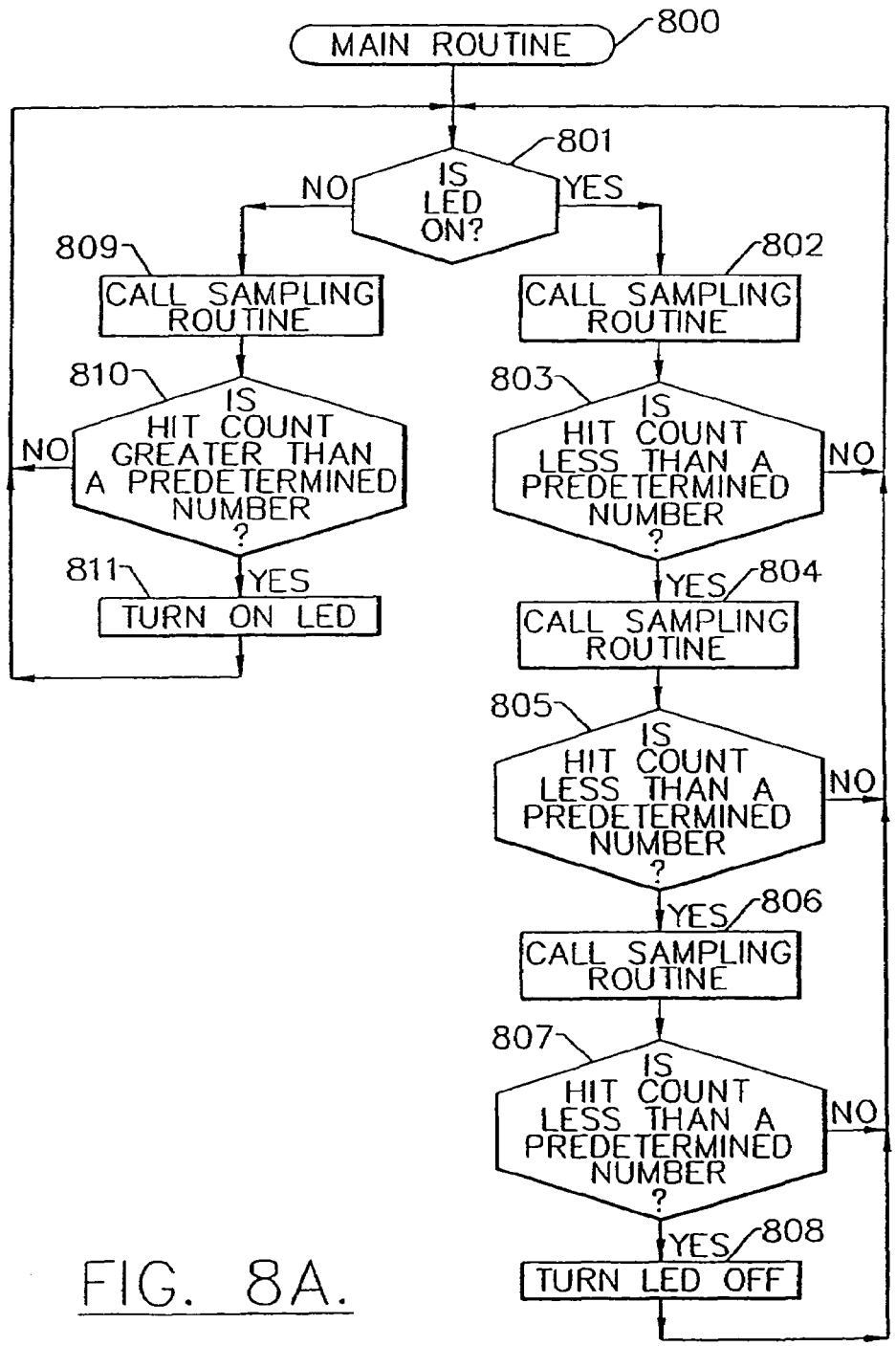
FIGS. 8A-B are software block diagrams illustrating operations used in determining a status of an antilock braking system from transitions of a data communications signal according to the present invention.
Figure 8B:
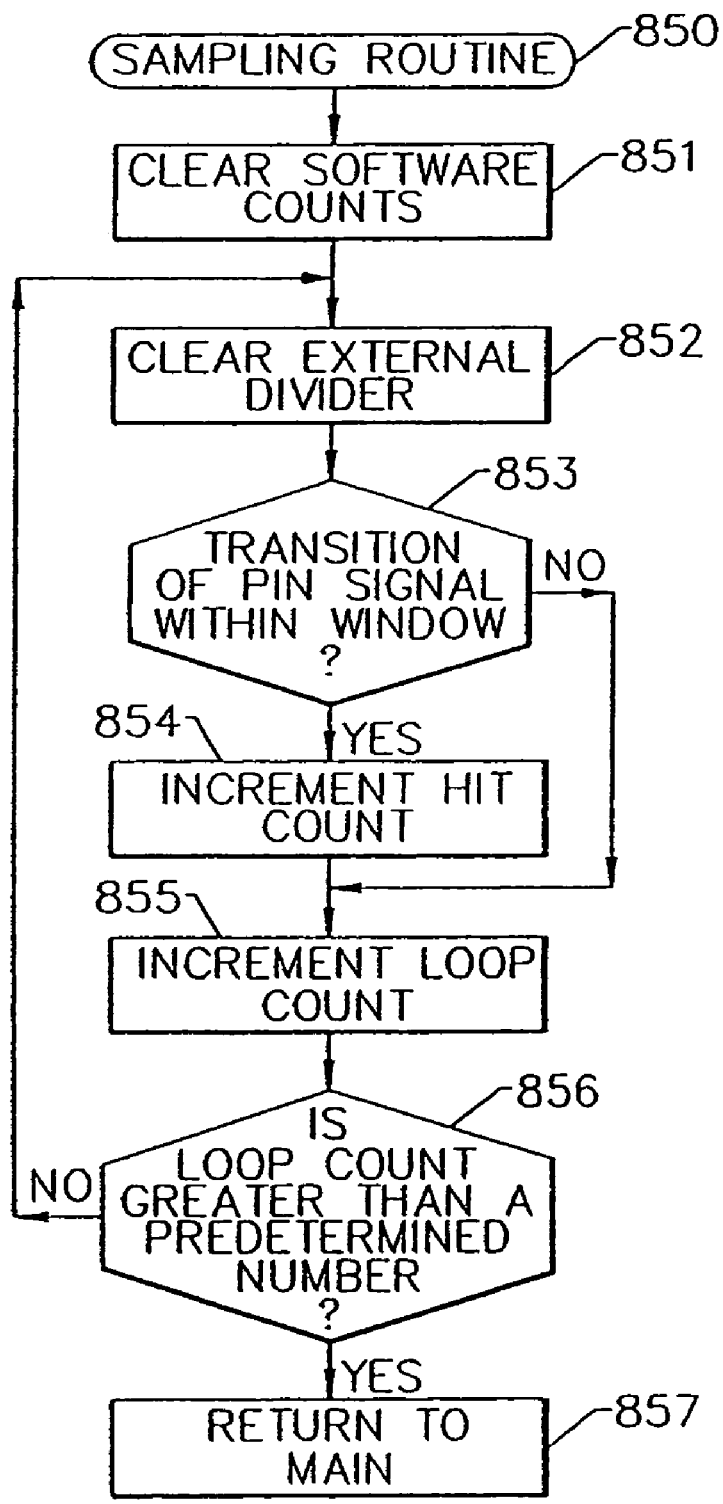

FIGS. 8A-B illustrate exemplary operations for the programmable controller chip U3 of FIG. 7. A pair of software counters control a main routine 800 and a sampling routine 850. One of the software counters is a first software hit count which counts the number of times a transition is detected in the second data-modulated signal at the second digital carrier signal output node PIN, while the other software counter is a loop count which keeps track of the number of times the second data-modulated signal is sampled during the sampling routine 850.

The main routine 800 determines if the external light-emitting diode LED is already in an "on" state 801. If it is, the sampling routine 850 is called, shown in FIG. 8B. The two software counts are initialized 851 and the external counter IC U2 is cleared 852. The sampling routine waits to see if a transition occurs in the second data-modulated digital carrier signal at the second digital carrier signal output node PIN during a predetermined time interval, preferably within 823 to 1280 milliseconds from the time the external counter IC U2 is cleared. If a transition occurs during the predetermined time interval, a software hit count is incremented 854. If not, the software loop count is incremented 855. If the loop count is less than a predetermined number 856, preferably 500, the routine returns to clear the external counter IC 852. If not, the sampling routine is exited 857.

Returning to FIG. 8A, if the program returns to the main routine 800 from the sampling routine 850 and the software hit count is less than a predetermined number, preferably 50, the main program recalls the sampling program 804. The sampling routine is called three times. After the final iteration 807, if the returned software hit count is less than a predetermined number, preferably 50, the diode LED is turned off before returning to the main program 800. If the diode LED is off entering the main 800, the main routine calls the sampling program once 809. If the returned software hit count is greater than a predetermined number, preferably 400, then the diode LED is turned off.

Techniques for demodulating a modulated carrier signal are known in other applications. It will be understood by those skilled in the art that the exemplary operations of FIGS. 8A and 8B provide sufficient hysteresis in the detection of the transitions of a modulated digital carrier signal to provide noise-resistant demodulation of the data-modulated signal 325. It will also be understood that other means of demodulating data-modulated digital carrier signal 325 may be used with the present invention.

Figure 2:
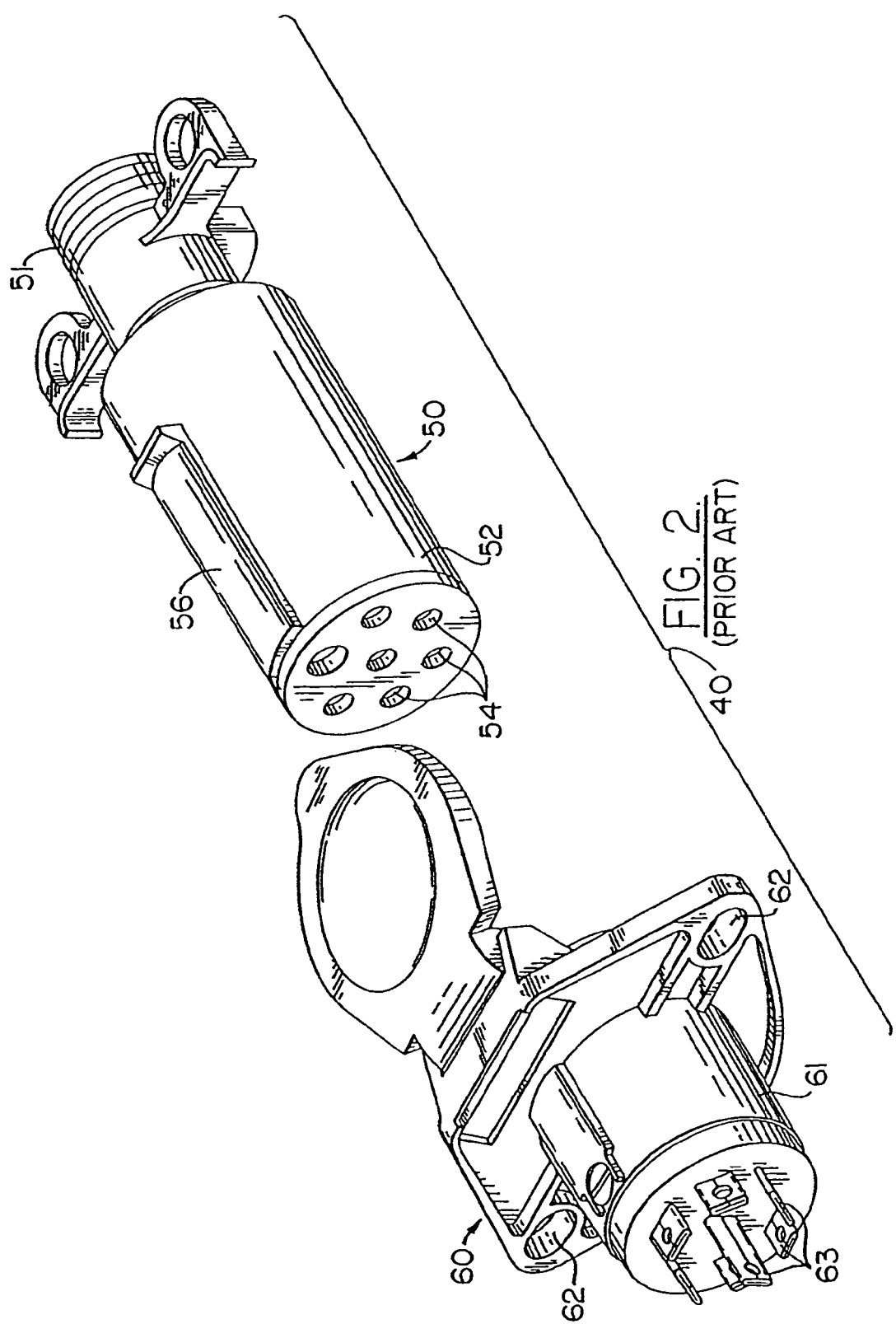
FIG. 2 is an isometric exploded view illustrating a prior art SAE J560 connector.
Figure 9A:
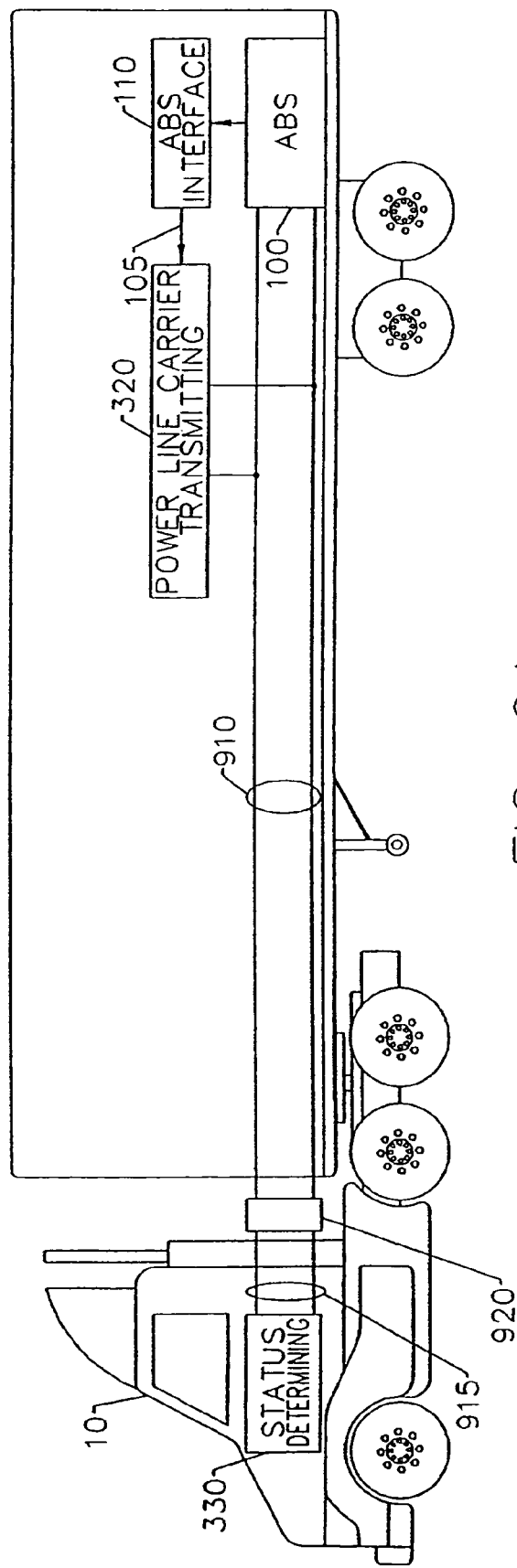
FIG. 9A is a schematic diagram illustrating a tractor/trailer combination with an antilock braking system monitoring system according to an embodiment of a warning system of the present invention.
Figure 9B:
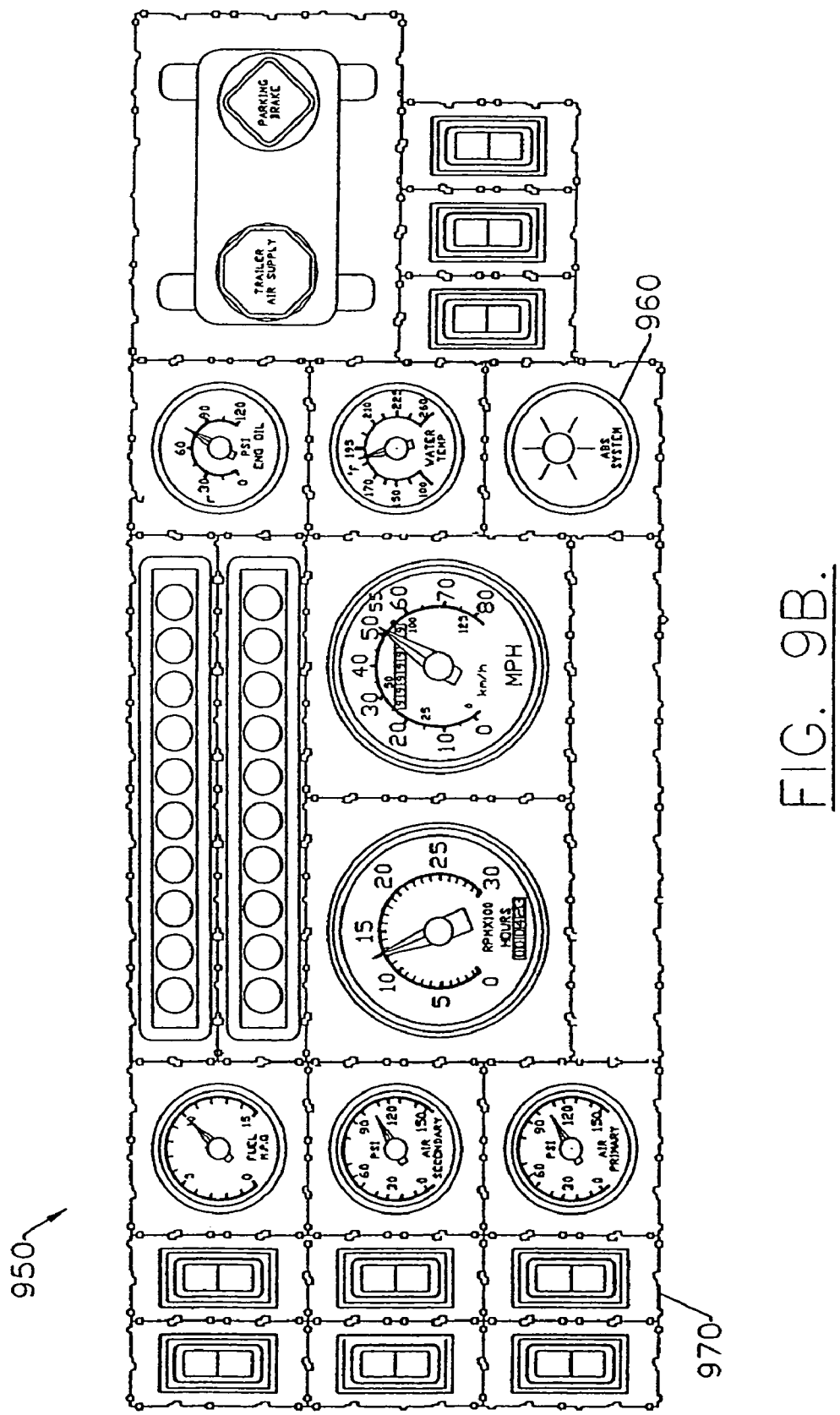
FIG. 9B is a perspective drawing illustrating an instrument cluster of a tractor including an indicator according to the present invention.

FIG. 9A illustrates an aspect of the present invention, showing status determining means 330 located in tractor 10. Power bus 30 is shown including a plurality of trailer power lines 910 connected to a plurality of tractor power lines 915 by a connector 920. Connector 920 preferably is an industry standard seven-pin SAE J560 connector as illustrated in FIG. 2. As shown in FIG. 9B, status determining means may include an indicator 950, here shown as a visual indicator 960 mounted on a tractor instrument cluster 970. As will be understood by those skilled in the art that indicator 950 may include other devices to indicate status of an antilock braking system to an operator of a tractor/trailer combination, including visual displays such as CRT's and lights, and audible annunciators. As will be also understood by those skilled in the art, status determining means 330 may be positioned elsewhere, including on the trailer.

Figure 12:
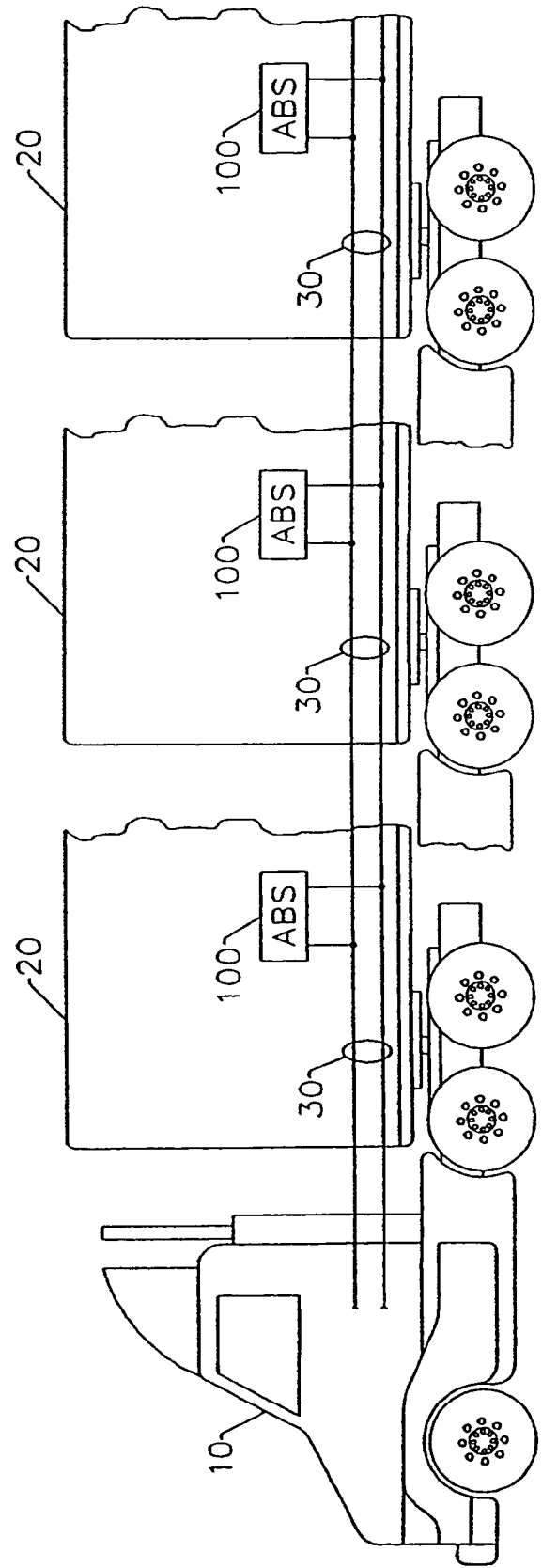
FIG. 12 is a schematic diagram illustrating a tractor connected to multiple trailers including an antilock braking system monitoring system according to an embodiment of a warning system of the present invention.

FIG. 12 illustrates another aspect of the present invention, showing a tractor 10 connected to multiple trailers 20. Trailers 20 may each include an antilock braking system 100 and an antilock braking system interface 110 producing a data signal 105. Each data signal 105 may be used to produce a data communications signal 325 which is superposed on the power bus 30. Status determining means 330 determines statuses of antilock braking systems 100 from the data communications signals 325. It will be understood by those skilled in the art that although data communications signals 325 may each have a unique predetermined carrier frequency allowing them to be separately received, power line carrier communicating means 320 and status determining means 330 may utilize, for example, time-multiplexing, code-multiplexing or other signal processing techniques to allow data communications signals 325 to have the same carrier frequency.

FIGS. 3-5 illustrate operations for monitoring an antilock braking system of a tractor/trailer operation according to the present invention. A data communications signal 325 is produced in power line carrier communicating means 320 from a data signal 105 representing a status of an antilock braking system 100 produced by an antilock braking system interface 110. The data communications signal 325 is superposed on a power bus 30 by power line carrier communicating means 320. A status 335 of the antilock braking system 100 is determined from the data communications signal 325.

The data communications signal 325 may be produced by modulating a carrier signal 425 having a predetermined carrier frequency by the data signal 105. The data communications signal may be superposed on power bus 30 by electrical coupling means 430, as illustrated by FIG. 4. The data communications signal 325 may be received by power line carrier receiving means 510, as shown in FIG. 5. The received data modulated carrier signal may be processed by processing means 520 to produce a data-modulated digital carrier signal 525. A status 535 of the antilock braking system 100 is detected from a count of transitions of the data-modulated digital signal 525 occurring during a predetermined time interval.

It has been found, according to the present invention, that spread spectrum technology, not generally used in tractor/trailer power line communications, is particularly suitable for the electrical environment of tractor/trailer systems. The energy of a spread spectrum data communications signal is spread across a broad range of frequencies such that even if one component is subject to coherent interference, the signal can still be reliably recovered. As the signal energy is widely distributed across a relatively wide spectrum, spread spectrum data communications systems tend to interfere less with coherent receivers such as radios. In contrast, the conventional modulation techniques utilized in some power line carrier systems is generally susceptible to interference from coherent electrical signals, such as those generated on the power bus of the tractor/trailer by switching transients from an alternator. In addition, because of the coherent nature of conventionally modulated signals, conventionally modulated signals may interfere with systems such as citizens' band (CB) radios, stereo systems, and navigation systems.

Figure 13:
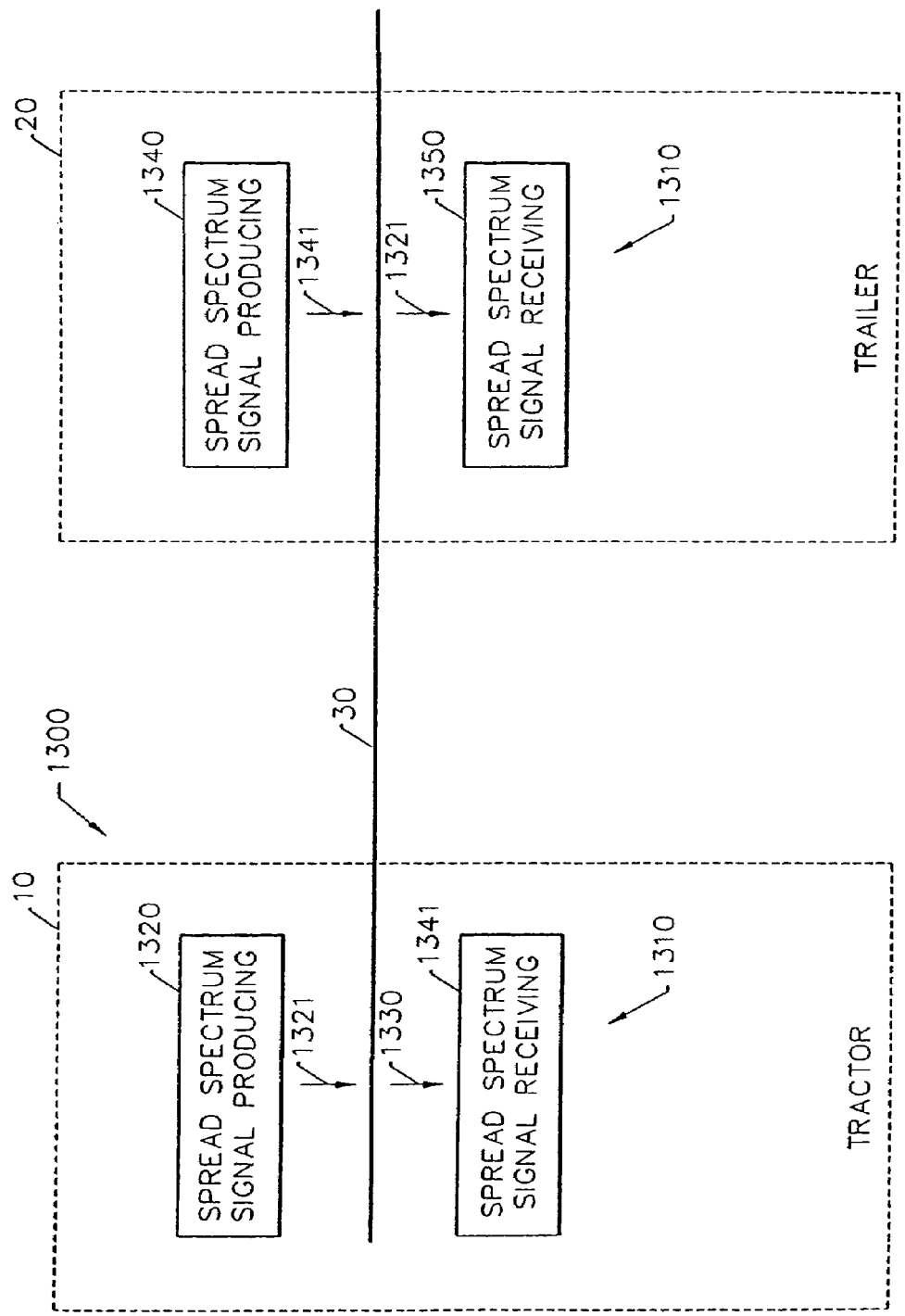
FIG. 13 is a block diagram illustrating an embodiment of a communications system according to the present invention.

As illustrated in FIG. 13, one advantageous embodiment of the communications system 1300 for a tractor/trailer combination according to the present invention includes bidirectional communicating means 1305 for communicating a first spread spectrum data communications signal 1341 representing the status of a first subsystem from a trailer 20 to a tractor 10 and for communicating a second spread spectrum data communications signal 1311 representing a command from the tractor 10 to a second subsystem on the trailer 20. As described above, the spread spectrum data communications signals 1311, 1341 are superposed on the power bus 30 that extends through the tractor and the trailer. As shown in FIG. 13, first spread spectrum signal producing means 1340, positioned on a trailer 20 and responsive to the first subsystem, produces the first spread spectrum data communications signal 1341 on the power bus 30. First spread spectrum signal receiving means 1320, positioned on the tractor 10 and responsive to the power bus 30, receives the first spread spectrum data communications signal 1341. Second spread spectrum signal producing means 1310, positioned on the tractor 10 and electrically coupled to the power bus 30, produces the second spread spectrum data communications signal 1311. Second spread spectrum signal receiving means 1320, positioned on the trailer 20 and responsive to the power bus 30, receives the second spread spectrum data communications signal 1311.

Figure 14:
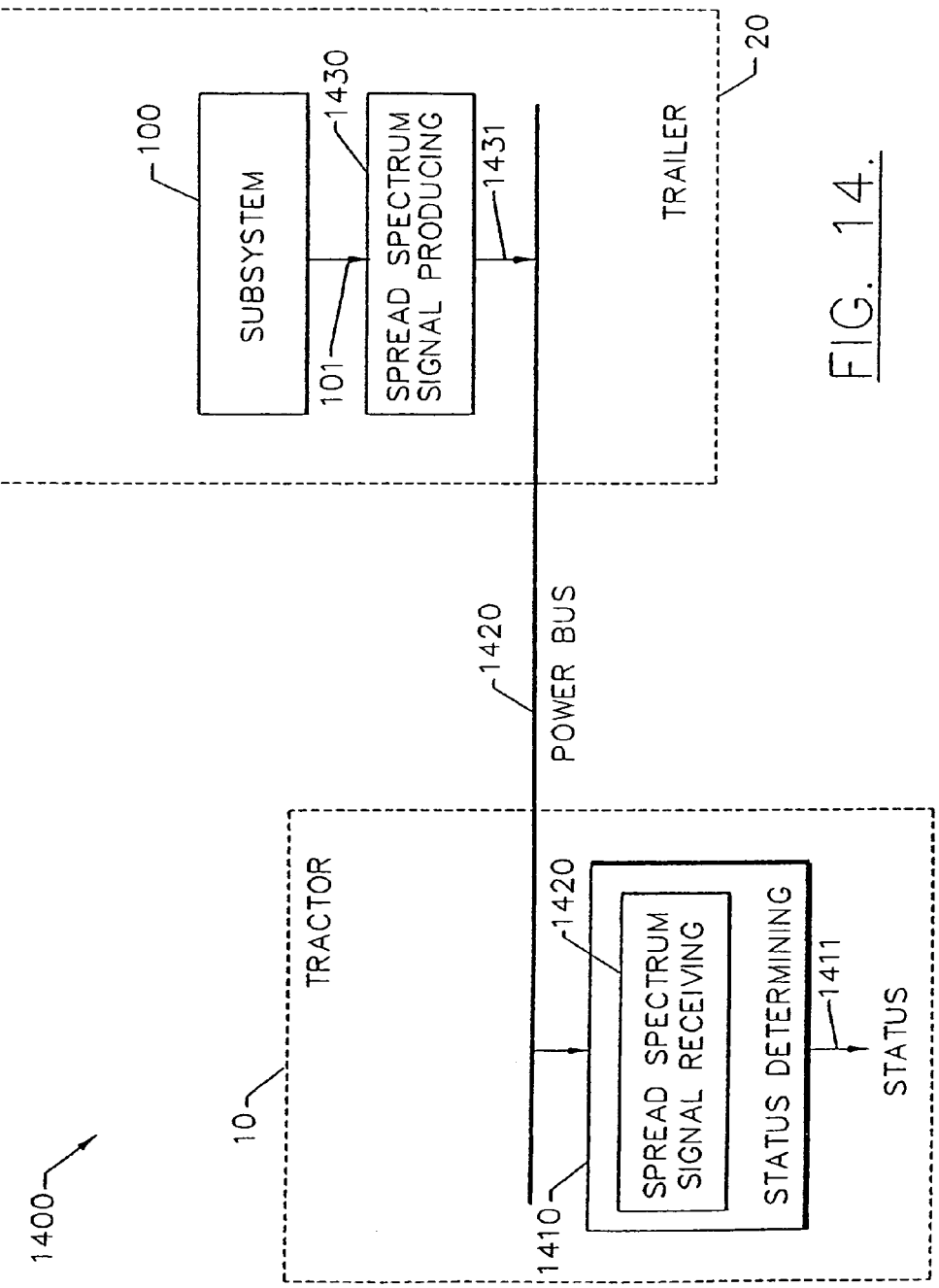
FIG. 14 is a block diagram illustrating another embodiment of a communications system according to the present invention.

FIG. 14 illustrates another embodiment of a communications system 1400 of the present invention for communicating the status of a subsystem 100, e.g., an antilock braking system, a trailer refrigeration system, a door sensor and the like. Spread spectrum signal producing means 1430, positioned on a trailer 20, produces a spread spectrum data communications signal 1431 on a power bus 30 that represents the status of the subsystem 100. Preferably, the spread spectrum data communications signal 1431 is produced from a status signal 101 produced by the subsystem 100 in the manner described above. Status determining means 1410, positioned on a tractor 10 and responsive to the power bus 30, determines the status 1411 of the subsystem 100 from the spread spectrum data communications signal 1431. Preferably, status determining means 1410 includes spread spectrum signal receiving means 1420, such as a spread spectrum transceiver as described below, for receiving the spread spectrum data communications signal 1431. Although the status signal 101 may be produced by the subsystem 100 in response to a command as described below, the subsystems themselves may initiate communications, such as with other subsystems in the trailer or tractor, if so desired.

Figure 15:
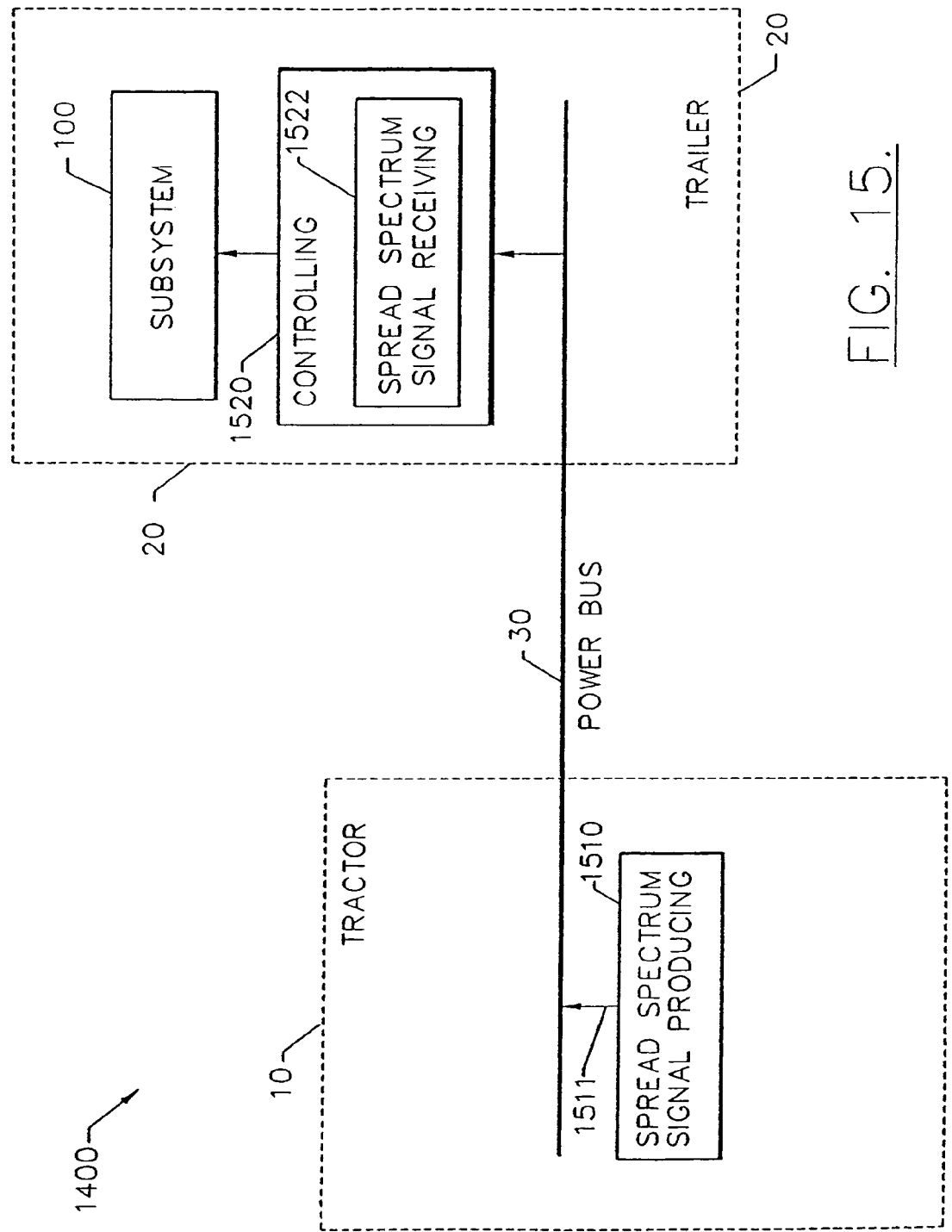
FIG. 15 is a block diagram illustrating yet another embodiment of a communications system according to the present invention.

FIG. 15 illustrates yet another embodiment of a communications system 1500 of the present invention for communicating a command from a tractor 10 to a subsystem 100, e.g., an antilock braking system, a trailer lighting system, and the like, in a trailer 20. Spread spectrum signal producing means 1510 produces a spread spectrum data communications signal 1511 representing the command, on a power bus 30. Controlling means 1520 controls the subsystem 100 based on the spread spectrum data communications signal 1511. Preferably, the controlling means 1520 includes spread spectrum signal receiving means 1522 for receiving the spread spectrum data communications signal 1511.

Figure 16:
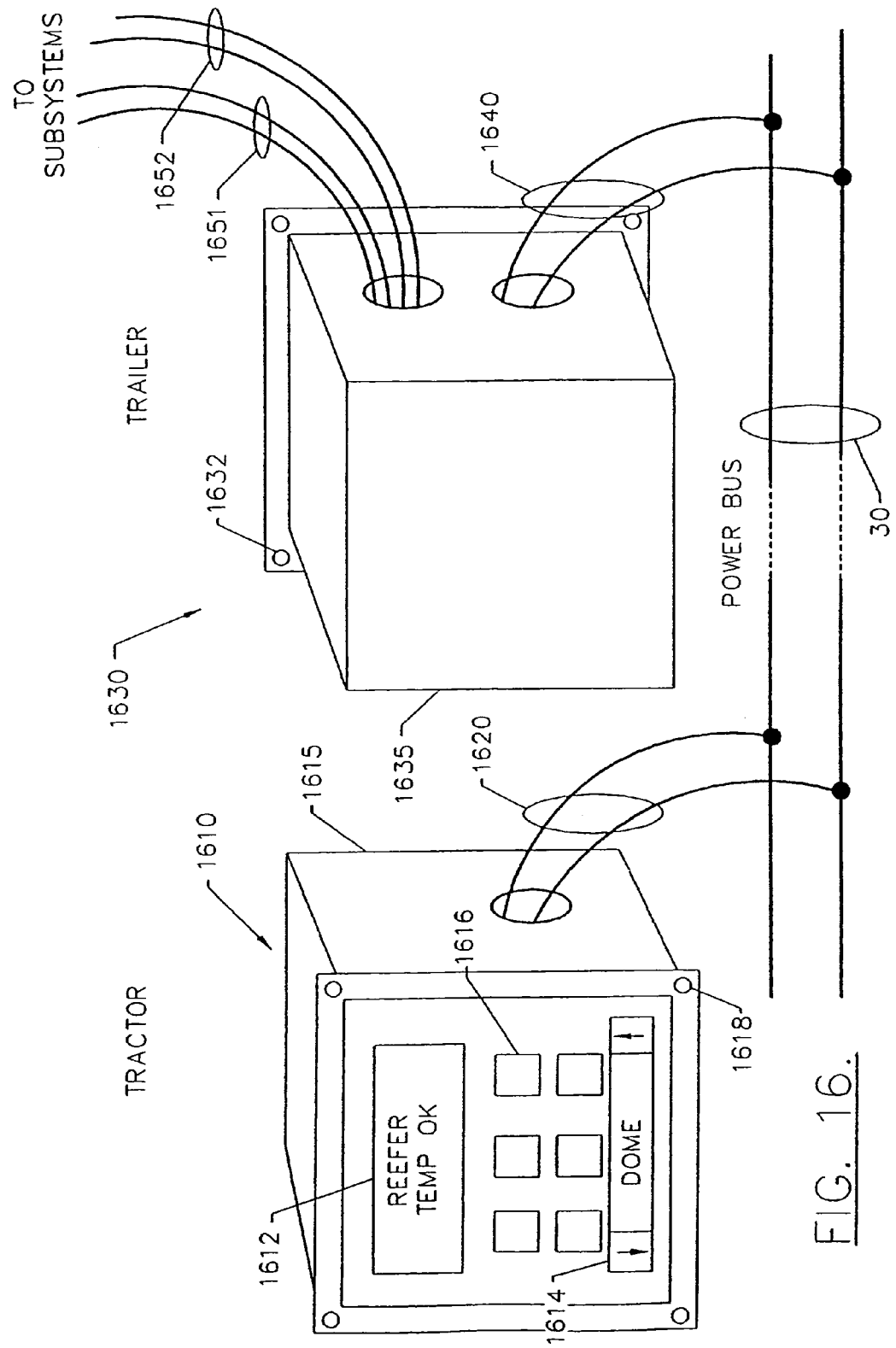
FIG. 16 illustrates embodiments of a tractor communications module and a trailer communications module according to the present invention.

As illustrated in FIG. 16, the various means illustrated in FIGS. 14 and 15 may be included in a tractor communications module 1610 and a trailer communications module 1630, each of which are connected to the power bus 30. The trailer communications module includes a communications module housing 1635, which houses the module components, and means 1632 for mounting the housing 1435 to a trailer, such as a mounting flange with holes drilled therein. The trailer communications module 1630 also preferably includes means 1640 for electrically connecting the module to the power bus 30, a status signal input 1651, and a command signal output 1652, here illustrated as pigtail connections, although those skilled in the art will understand that other devices may be employed for the connecting means 1640, the input 1651 and the output 1652, such as connectors.

Likewise, the tractor communications module 1610 preferably includes a communications module housing 1615 which houses the module components, and means 1518 for mounting the module 1610 to a tractor, such as a mounting flange with mounting holes drilled therethrough. The tractor communications module 1610 also preferably includes an indicator, such as an alphanumeric display 1612 and LED displays 1616 which indicate the status to an operator, operator input means, such as a membrane switch 1614 positioned on the module 1610, for receiving a command from an operator, as well as means 1620, such as a pigtail connection, for electrically connecting the module 1610 to the power bus 1620. Although the command may originate with the operator, the communications system of the present invention can be designed to transmit commands to the various electrical subsystems on the trailer that are generated automatically, such as according to a predetermined schedule or in response to a particular event. Among other things, the command may request that one or more subsystems provide status or other data.

Although not illustrated, one or both of the trailer communications module 1630 and the tractor communications module 1610 can include one or more lights, such as LEDs, for providing a visible indication of the status and current operations of the module. For example, the modules can include a green LED that is illuminated when the module is receiving power and is operating properly. In addition, the modules can include red and yellow LEDs which are illuminated or flash when the module is transmitting and receiving spread spectrum data communications signals, respectively. Further, the modules can include addition LEDs to indicate the protocol of the data being communicated, as described below.

Figure 17:
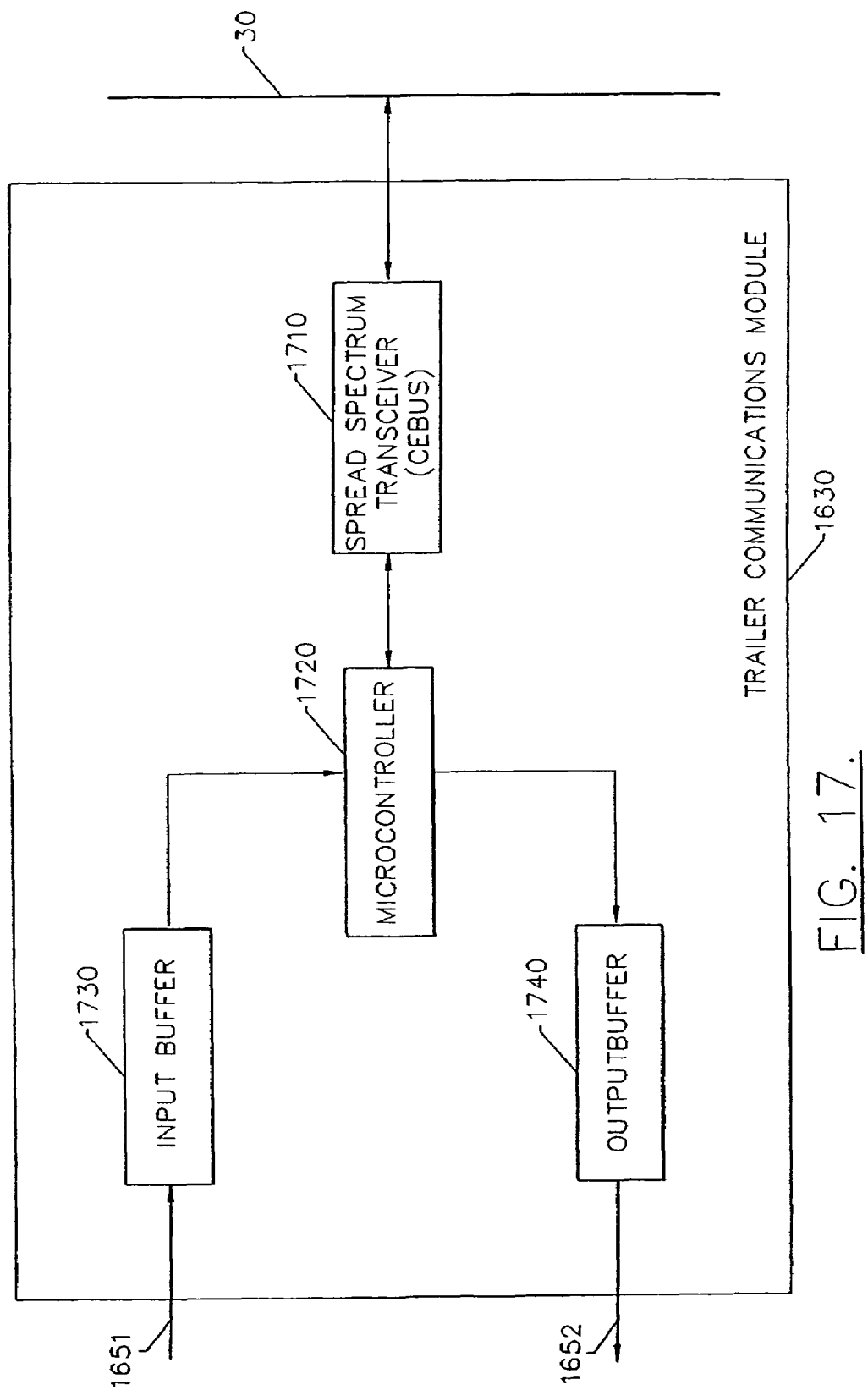
FIG. 17 is a block diagram illustrating an embodiment of a trailer communications module according to the present invention.

A preferred embodiment of a trailer communications module 1630 includes the spread spectrum signal producing means 1430 of FIG. 14, and the controlling means 1520 of FIG. 15, implemented as shown in FIG. 17 using a microcontroller 1720 connected to input and output buffer circuits 1730, 1740 and a spread spectrum transceiver 1710, preferably a CEBus compliant transceiver such as the above-mentioned CEBus-compliant devices produced by the Intellon Corporation. In particular, these devices employ spread spectrum techniques and contention-resolving/collision detecting data transfer protocols to improve data communications, as described in U.S. Pat. No. 5,090,024 to Vander Mey et al. These devices are designed to interface with a microcontroller or similar data processor via a parallel or serial data interface, producing spread spectrum data packets from data received from the processor over the interface and converting spread spectrum data packets into conventional digital signals which are conveyed to the data processor over the data interface.

Figure 18:
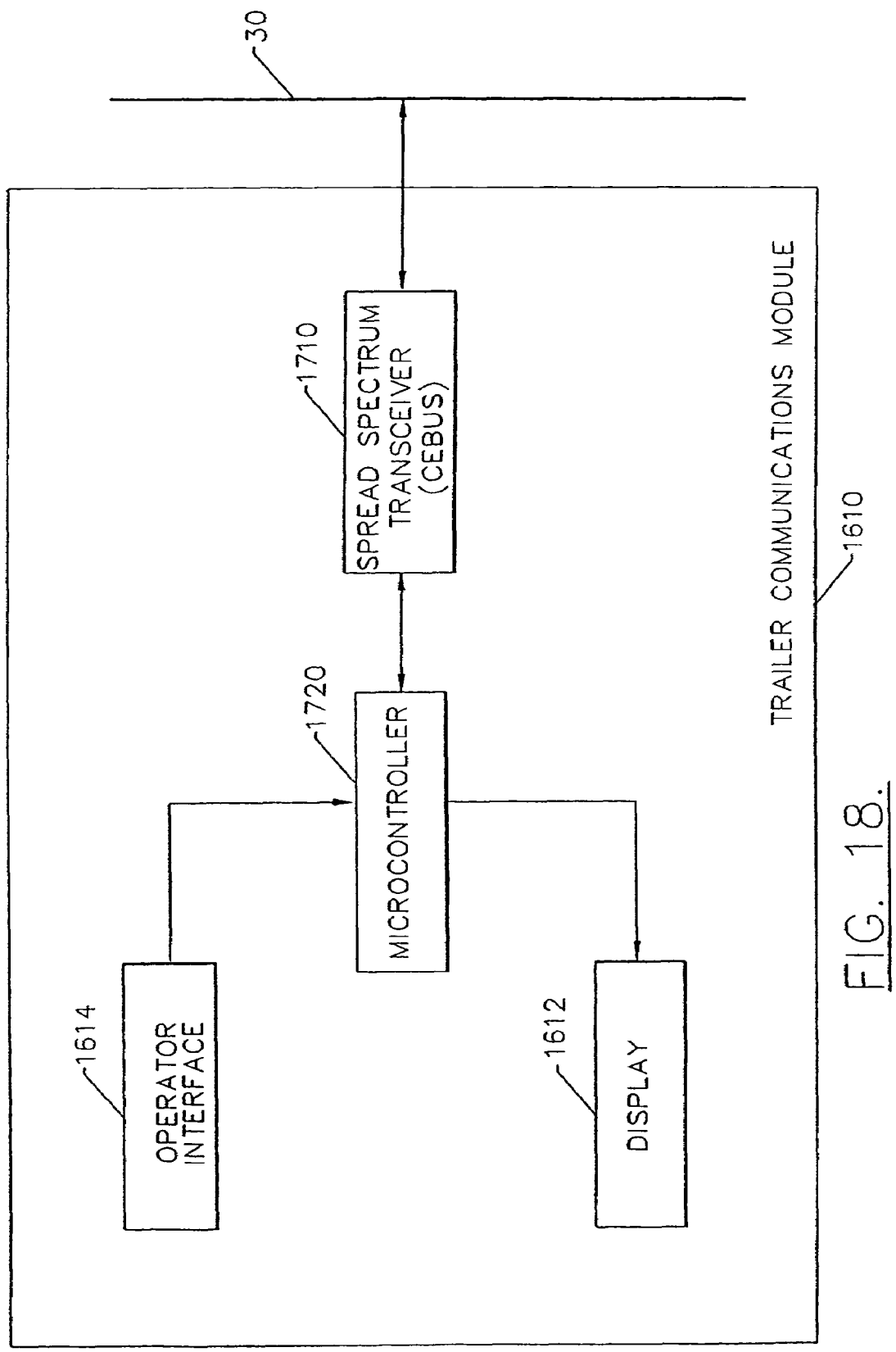
FIG. 18 is a block diagram illustrating an embodiment of a tractor communications module according to the present invention.

In a preferred embodiment of a tractor communications module 1630, the status determining means 1420 of FIG. 14 and the spread spectrum signal producing means 1510 of FIG. 15 are similarly implemented using a microcontroller 1720 and a spread spectrum transceiver 1710, as illustrated in FIG. 18. In the tractor communications module 1630, however, the microcontroller 1720 interfaces with operator input means 1614 and an indicator 1612, to receive commands from an operator and to indicate status to the operator. The use of microcontrollers to control displays and receive inputs from input devices is well-known to those skilled in the art, and need not be discussed in detail herein.

Figure 19:
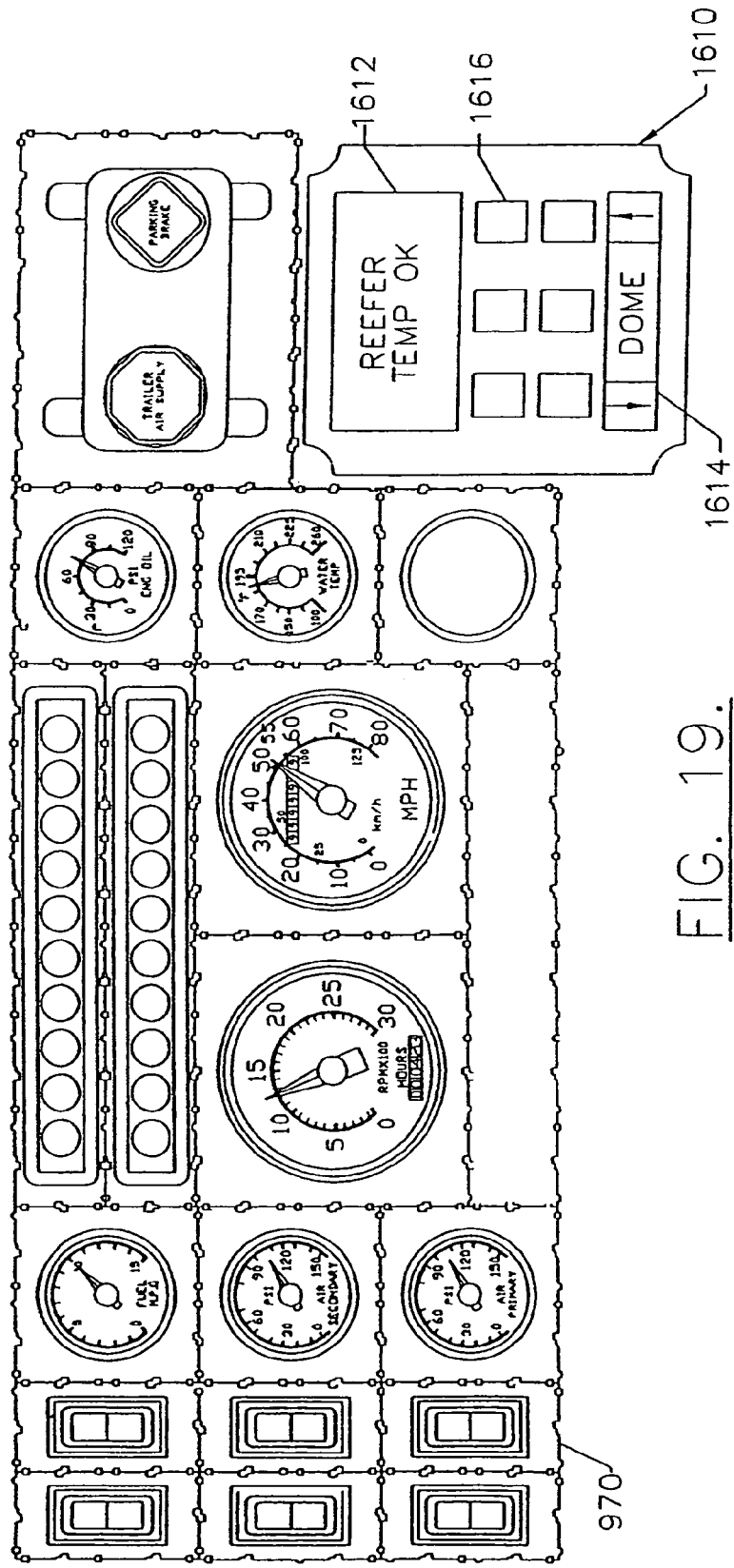
FIG. 19 illustrates an embodiment of the visual indicator provided by a tractor communications module according to one embodiment of the present invention.

As illustrated in FIG. 19, the tractor communications module 1610 may be mounted on the instrument cluster 970 of a tractor, such that the indicators 1612, 1614 are viewable by an operator positioned in the tractor 10, and the operator input means 1514 is accessible to the operator.

Figure 20:
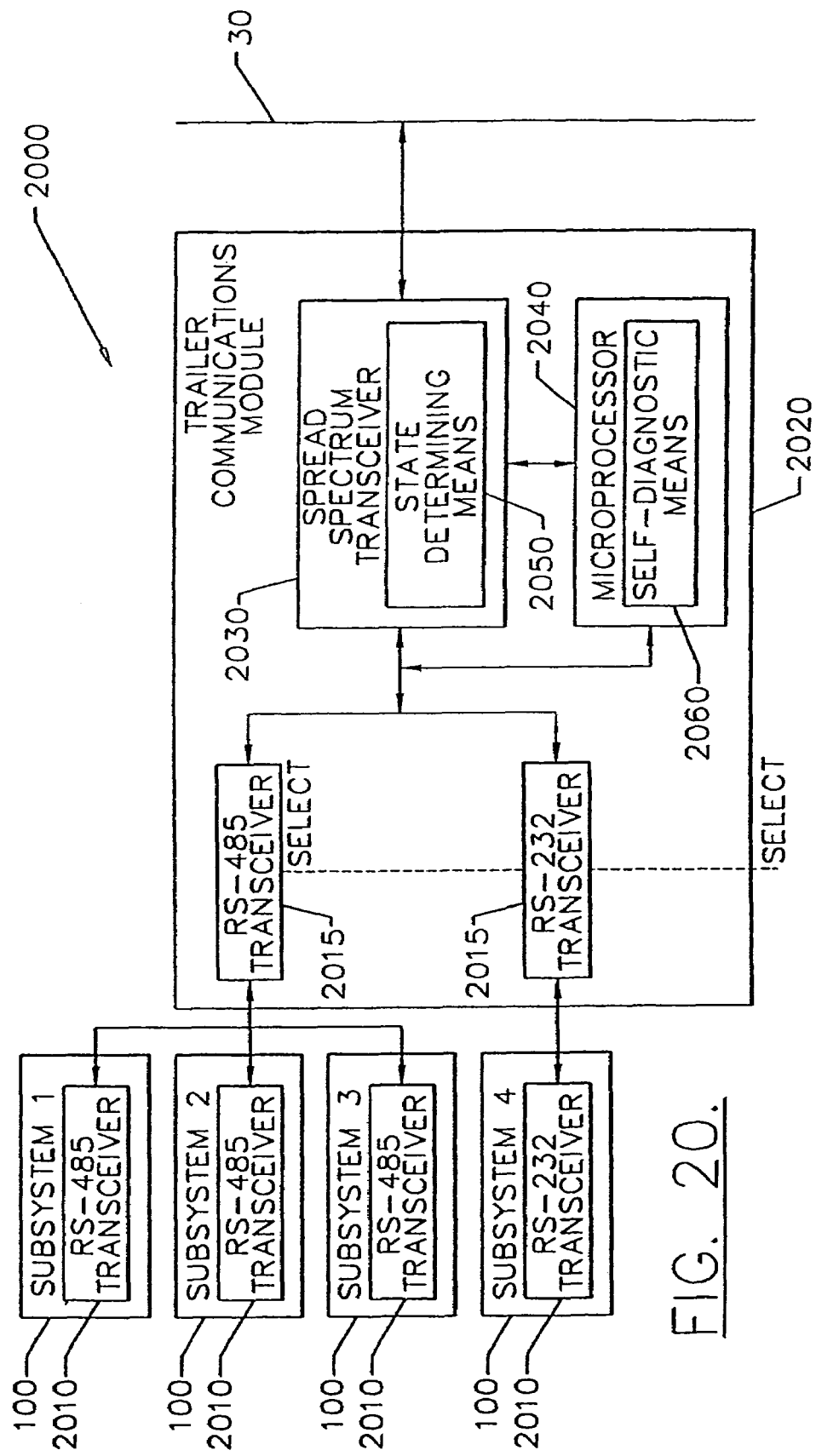
FIG. 20 is a block diagram illustrating the communication between a plurality of nodes and the power line that is provided by the trailer communications module of one embodiment of the present invention.

As shown schematically in FIG. 20, the power bus 30 oftentimes supplies power to a number of subsystems 100 on one or more trailers 20. According to one particularly advantageous embodiment, the communications system 2000 is designed to communicate or otherwise broadcast the respective status of each of the plurality of subsystems 100 via the power bus 30. Moreover, the communications system 2000 of this advantageous embodiment is designed to communicate the respective status of each of the plurality of subsystems 100 even through the subsystems communicate according to at least two different protocols. For example, the subsystems 100 can include an antilock braking system that communicates according to a J-1708 protocol and a refrigeration unit that communicates according to an RS-232 protocol.

According to this embodiment, the trailer communications module 2020 and, more particularly, the spread spectrum signal producing means preferably includes a plurality of protocol specific transmitters 2010 associated with respective ones of the subsystems 100. As shown in FIG. 20, each subsystem generally includes a protocol specific transmitter 2010 that converts the digital signals otherwise provided by the subsystem to signals having a predetermined protocol for transmission to the trailer communications module 2020. For example, the protocol specific transmitters 2010 can include an RS-485 transceiver associated with each antilock braking system for converting digital signals to J-1708 signals for transmission to the trailer communications module 2020. In addition, the protocol specific transmitters can include an RS-232 transceiver associated with a refrigeration unit for converting digital signals to RS-232 signals for transmission to the trailer communications module 2020. The conversion of the digital signals to another specific signal protocol, such as J-1708 and RS-232, prior to transmission of the signals to the trailer communications module 2020 is particularly important since signal protocols, such as J-1708 and RS-232, provide more robust signal transmission capabilities and reduce the deleterious impact of noise on the signals than otherwise provided by the transmission of signals having conventional TTL logic levels. Although J-1708 and RS-232 signal protocols are described herein, the protocol specific transmitters can be designed to receive and process signals formatted according to any desired protocol. For example, the protocol specific transmitter can be designed to receive and process signals formatted according to a J1850, J1939, RS 170 or ISO protocol, if so desired.

As also shown in FIG. 20, the trailer communications module 2020 also includes protocol specific transceivers 2015 for receiving the signals from the subsystems 100 and reconverting the signals to digital signals having TTL logic levels, for example. The trailer communications module 2020 of FIG. 20 includes protocol specific transceivers 2015 that communicate with multiple subsystems 100, all of which communicate according to the same protocol, i.e., subsystems 1, 2 and 3 of FIG. 20. However, the trailer communications module 2020 can include a dedicated protocol specific transceiver 2015 for each subsystem, if so desired.

The spread spectrum signal producing means of this embodiment also preferably includes means for producing spread spectrum data communications signals representative of the status of respective ones of the subsystems 100 based upon the signals provided by the subsystems via the protocol specific transceivers 2010, 2015. As shown in FIG. 20 and as described above, the means for producing spread spectrum data communications signals typically includes a spread spectrum transceiver 2030 for converting the digital signals provided by protocol specific transceivers 2015 to spread spectrum data communications signals for transmission via the power line 30, and vice versa. Based upon the spread spectrum data communications signals transmitted via the power line 30, the status determining means of the communications system 2000 of this embodiment can determine the status of respective ones of the plurality of subsystems, i.e., the status of the antilock braking system and the status of the refrigeration unit. As described above, the status determining means as well as any associated indicator or warning system is typically included in the tractor communications module mounted in the cab of the tractor 10.

The protocol specific transceivers 2010, 2015 preferably employ conventional collision avoidance and collision detection techniques in order to minimize collisions between signals intended for the spread spectrum transceiver 2030. The protocol specific transceivers 2010, 2015 also preferably employ conventional techniques from recovering from any such collisions that are detected such that the communications system 2000 of this embodiment of the present invention will continue to function properly. As known to those skilled in the art, conventional collision avoidance techniques involve assigning different priorities and, correspondingly, different waiting times to each of the protocol specific transceivers 2010, 2015, while conventional collision recovery techniques involve one or more retransmissions of the signal following various waiting periods. However, the communications system 2000 and, more particularly, the protocol specific transceivers 2010, 2015 can include other collision avoidance and collision recovery techniques known to those skilled in the art without departing from the spirit and scope of the present invention.

In addition to broadcasting spread spectrum data communications signals from the subsystems 100 to the status determining means, the communications system 2000 of this embodiment can also receive signals, such as commands (or other data) requesting particular types of data including the status of a particular subsystem, that are broadcast via the power bus 30. Although only a single trailer communications module 2020 is illustrated in FIG. 20 as being attached to the power line 30, each trailer typically includes one or more trailer communications modules 2020 (also referred to as a bridge). Thus, the communications system 2000 of a tractor/trailer combination that includes multiple trailers 20 will preferably include multiple trailer communications modules 2020, one of which is positioned on each trailer and each of which may communicate with a number of subsystems 100 within the respective trailer 20. As such, commands or data broadcast via the power bus 30 will be received by the spread spectrum transceiver 2030 of each respective trailer communications module 2020. The spread spectrum transceivers 2030 will convert the spread spectrum data communications signal that represents the command or data to a digital signal for presentation to the protocol specific transceivers 2015 of the trailer communications module 2020. Typically, the digital signal that is presented to the protocol specific transceivers 2015 of the trailer communications module 2015 includes an address or destination identifying the specific subsystem to which the command or data is directed as well as the address of the source or origin of the command or data. Alternatively, the command or data could be proceeded by a message broadcast via the power bus 30 that the ensuing command is intended for only one particular subsystem 100 or one particular class of subsystems, such as the antilock braking systems on each of the trailers 20. The message that identifies the subsystem to which the ensuing command or data is directed may be interpreted by the protocol specific transceivers 2015 themselves or by a microprocessor 2040 associated with the spread spectrum transceiver 2030 and the protocol specific transceivers as shown in FIG. 20.

Alternatively, each trailer communications module 2000 can include a selection input that can be used to select either the particular subsystem 100 or class of subsystems with which communication will be established. For example, the select line of the trailer communications module 2000 of the illustrated embodiment may be used to select either those subsystems that communicate according to J-1708 protocol, i.e., subsystems 1, 2 and 3, or the subsystems that communicate according to RS-232 protocol, i.e., subsystem 4. The select line may be hardwired during system installation if the trailer communications module 2020 will be communicating with either a particular subsystem or a particular class of subsystem. As such, a universal trailer communications module 2020 or bridge that has the capability for communicating with a wide variety of subsystems may be installed and subsequently configured to optimize communications with the subsystems of interest.

In embodiments of the communications system 2000 of the present invention that include a spread spectrum transceiver 2030 that both receives and transmits signals, the spread spectrum transceiver 2030 preferably includes means 2050 for determining the state of the transceiver. In particular, the spread spectrum transceiver preferably includes a state register or an associated microprocessor 2040 which continuously identifies the state of the spread spectrum transceiver 2030, i.e., either receiving or transmitting. As such, the signals transmitted by the spread spectrum transceiver 2030 will not be received and processed by the spread spectrum transceiver but will, instead, be recognized as having been transmitted by the spread spectrum transceiver, thereby avoiding erroneous signal reception and transmission by the spread spectrum transceiver 2030.

As described above, the communications system 2000 and, more particularly, the spread spectrum signal producing means of one embodiment includes a plurality of spread spectrum transmitters 2030, typically spread spectrum transceivers, responsive to one or more subsystems 100 for producing spread spectrum data communications signals representative of the status of the respective subsystems. In this embodiment, the spread spectrum signal producing means preferably includes self-diagnostic means 2060 associated with at least one of the spread spectrum transmitters 2030 for monitoring the signals provided to the respective spread spectrum transmitter and for halting further transmission from the respective spread spectrum transmitter to the remainder of the communications system 2000 if the self-diagnostic means determines that the signals provided to the respective spread spectrum transmitter are indicative of a malfunctioning or otherwise defective subsystem 100 or protocol specific transceiver 2010, 2015. As a result, the remainder of the communications system 2000, including the remainder of the spread spectrum transmitters 2030, can continue to operate in an otherwise normal fashion.

Although the spread spectrum transceiver 2030 can include the self diagnostic means 2060, the trailer communications module 2020 of the illustrated embodiment includes a microprocessor 2040 that includes the self-diagnostic means. The self-diagnostic means is typically embodied by a combination of hardware and software which cooperate to monitor the standardized signals provided to the spread spectrum transceiver 2030 by the associated signal protocol transmitters 2015. Although a variety of techniques can be utilized to determine if the signals provided to the spread spectrum transceiver 2030 are inaccurate, the self-diagnostic means 2060 of one embodiment analyzes the signals to determine: (1) if the data is nonsensical, and/or (2) if the check sum as well as any address data associated with the signals are incorrect. For example, the self-diagnostic means 2060 may determine that the signals provided to the spread spectrum transceiver 2030 are inaccurate if the signal remains at the same signal level for an extended time period. More specifically, if the signals provided to the spread spectrum transceiver 2030 remain high for 20 or more bit times, the self-diagnostic means 2060 may determine that a subsystem 100 or a protocol specific transceiver 2010, 2015 is malfunctioning or is otherwise defective. As a result, the self-diagnostic means 2060 will generally prohibit the spread spectrum transceiver 2030 from producing spread spectrum data communications signals for broadcast via the power bus 30. Instead, the spread spectrum transceiver 2030 would either be inactivated or would transmit a message via the power bus 30 to the operator that some type of error has occurred. Thereafter, the self-diagnostic means 2060 can periodically reexamine the signals provided to the spread spectrum transceiver 2030 to determine if the signals now appear to be proper, in which case the spread spectrum transceiver could again be activated.

Figure 21:
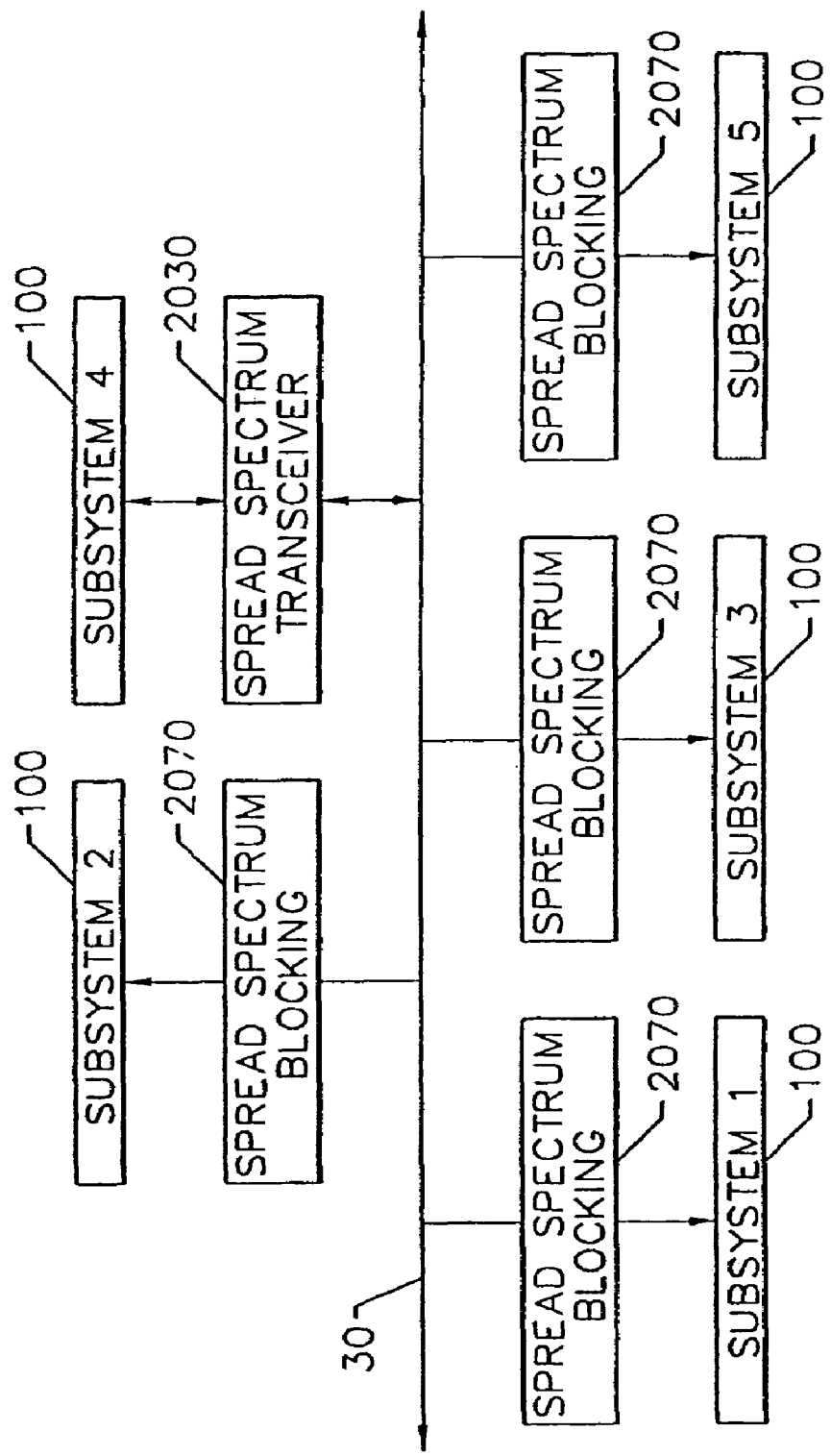
FIG. 21 is a block diagram illustrating a power bus that provides electrical power to a number of subsystems that are each associated with a spread spectrum blocking device.

In order to permit the communications system 2000 of the present invention to effectively broadcast a spread spectrum data communications signal representing the status of a first subsystem on the power bus 30, the communications system of one advantageous embodiment further includes spread spectrum blocking means 2070 associated with respective one of the other subsystems 100, as shown in FIG. 21. The spread spectrum blocking means 2070 protect the spread spectrum data communications signals placed on the power bus 30 by the spread spectrum signal producing means from attenuation by the other subsystems 100. Typically, the spread spectrum blocking means 2070 is disposed between each subsystem 100 and the power bus 30 as shown in FIG. 21.

In one embodiment, the spread spectrum blocking means 2070 include a plurality of inductive elements associated with respective ones of the subsystems 100. Alternatively, the spread spectrum blocking means 2070 can include a plurality of ferrite beads associated with respective ones of the subsystems 100. In any event, the spread spectrum blocking means 2070 is designed to prevent or at least significantly reduce the filtering or other attenuation of the spread spectrum data communication signals that would otherwise be performed the other subsystems 100 electrically connected to the power bus that are specifically designed in some instances to filter out high frequency signals including at least some spread spectrum signals. As such, the status determining means of the communications system 2000 can receive and process a spread spectrum data communications signal without concern that the spread spectrum data communications signal has been significantly attenuated or otherwise distorted by the other subsystems 100.

Figure 22:
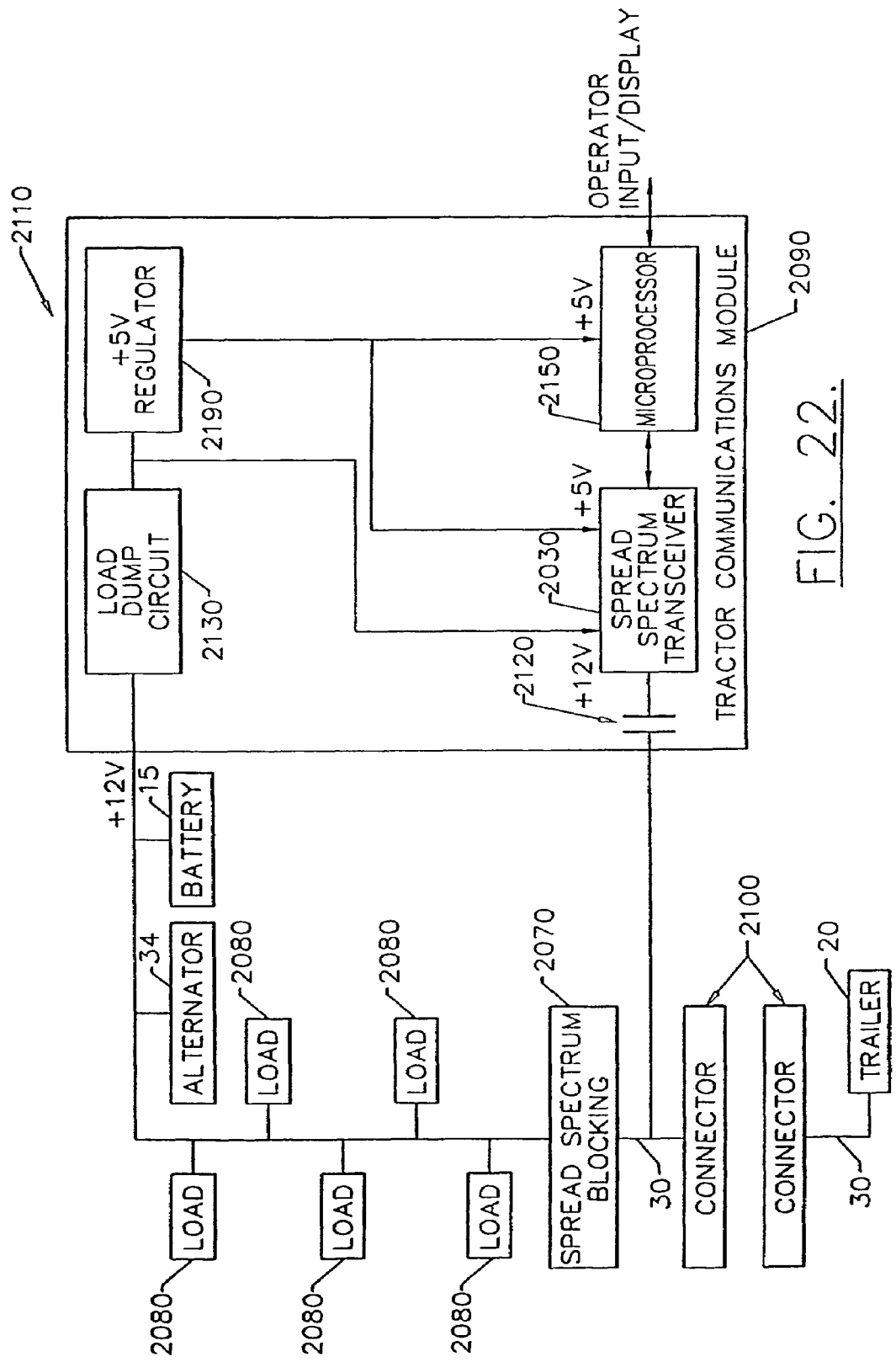
FIG. 22 is a block diagram illustrating a tractor communications module according to one embodiment of the present invention that bypasses a number of other loads that are electrically connected to the power bus and which superposes the spread spectrum communications data signal on the power bus at a point near the connector.

The power bus 30 also typically supplies electrical power to a plurality of electrical loads 2080 within the tractor 10, as shown in FIG. 22. In order to prevent attenuation or other distortion of the spread spectrum data communications signals by the plurality of other electrical loads 2080 within the tractor 10, the spread spectrum signal producing means of the tractor communications module 2090, including the spread spectrum transceiver 2030, is preferably electrically connected to the tractor power line at a point nearer the connector 2100 than the respective points at which the plurality of electrical loads 2080 are electrically connected to the tractor power line. More particularly, the communications system 2110 of this embodiment can include a capacitor 2120 disposed between the spread spectrum signal producing means and the respective tractor power line to couple the spread spectrum data communications signals to the respective tractor power line with little, if any, distortion or attenuation arising as a result of the other electrical loads 2080 within the tractor 20 that are electrically connected to the power bus 30.

As shown in FIG. 22, the tractor communications module 2090 can also include a load dump circuit 2130 for protecting the spread spectrum transceiver 2120 from voltage spikes or other excessive voltages. In addition, the tractor communications module 2090 can include a regulator 2190, such as a +5V regulator, for providing a regulated voltage to the spread spectrum transceiver 2120 and any associated circuitry, such as microprocessor 2150.

Figure 23:
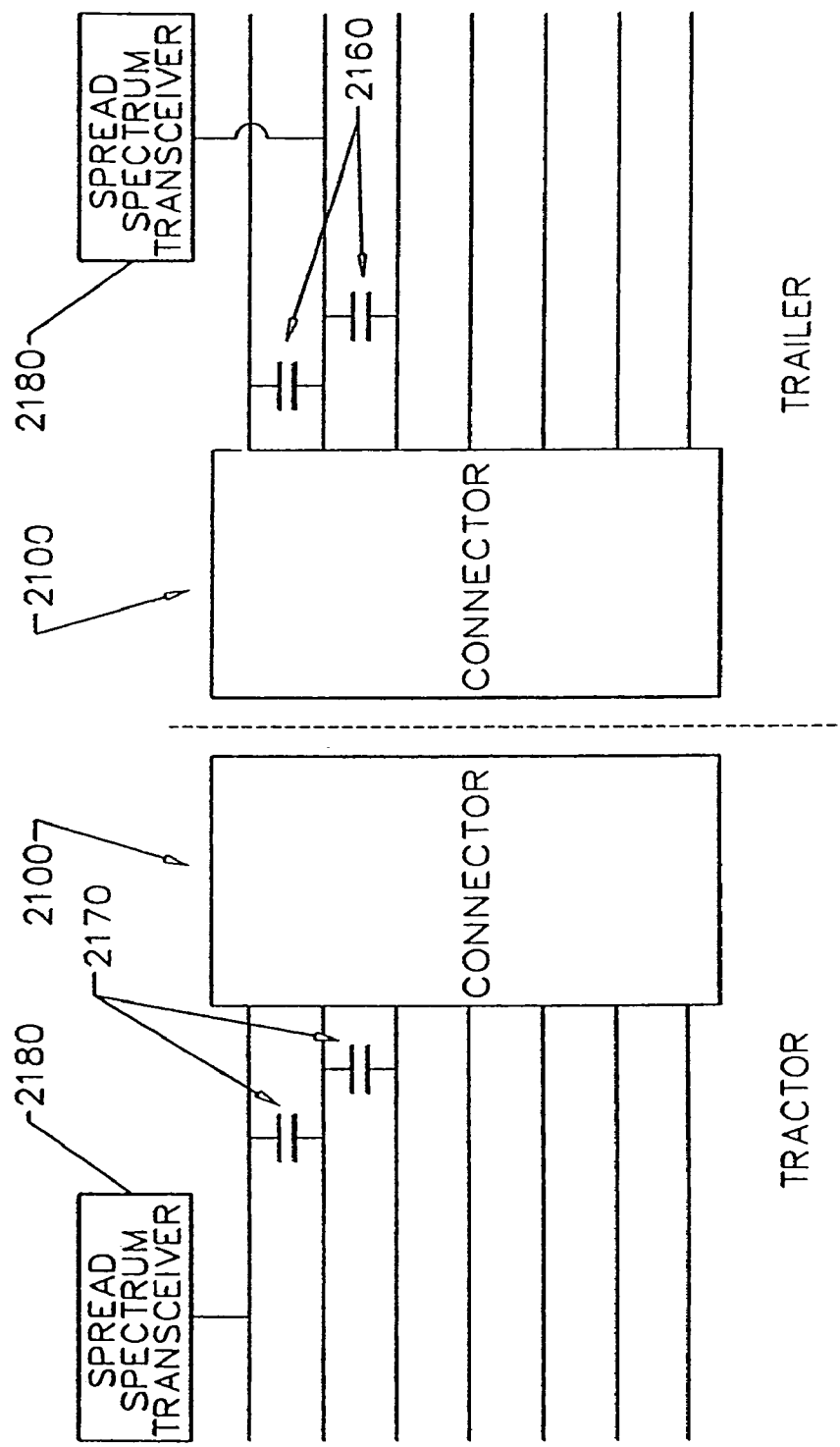
FIG. 23 is a schematic drawing illustrating the capacitive coupling of several of the conductors or power lines that are interconnected by a conventional seven-pin connector.

According to one advantageous embodiment, the power bus 30 also includes a first capacitor 2160 disposed between at least two of the trailer power lines, i.e., the first plurality of conductors, and a second capacitor 2170 disposed between at least two of the corresponding tractor power lines, i.e, corresponding ones of the second plurality of conductors. Since the spread spectrum signal producing means of this embodiment including the respective spread spectrum transceivers 2180, are electrically connected to one of the capacitively coupled power lines as shown in FIG. 23, the spread spectrum data communications signals are transmitted via each of the capacitively coupled power lines. As a result, the communications system of this embodiment provides redundancy if one of the power lines should fail or have some other problem.

Thus, the communications system of the present invention preferably utilizes spread spectrum data communications signals in order to reduce interference and other distortion with other electrical devices within the tractor/trailer combination. In addition, the communications systems described above further optimize the transmission and reception of spread spectrum data communications signals to permit reliable communication with a wide variety of subsystems 100 that may transmit and receive signals according to different signal protocols. In addition, the communications systems of the above-described embodiments are specifically designed to minimize the deleterious impact of other subsystems or electrical loads that are electrically connected to the power bus 30 and to provide self-monitoring to identify inaccurate signals prior to the broadcast of those signals via the power bus, thereby avoiding corruption of the power bus with inaccurate signals.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. Apparatus for communicating within a vehicle including a power bus, said vehicle including a vehicle subsystem, the apparatus comprising:
    a transceiver to produce a data-modulated signal from a data signal representing a status of the vehicle subsystem, the data-modulated signal being coupled to the power bus;
    an electrical circuit to receive the data-modulated signal from the power bus and determine the status of the vehicle subsystem from said data-modulated signal; and
    an indicator responsive to the electrical circuit to indicate the status of the vehicle subsystem to an operator positioned in the vehicle.

2. The apparatus of claim 1 wherein the data-modulated signal is a data-modulated spread spectrum signal.

3. The apparatus of claim 2 wherein the vehicle subsystem comprises an anti-lock braking system.

4. The apparatus of claim 1 wherein the vehicle is a tractor/trailer.

5. The apparatus of claim 1 wherein the electrical circuit further comprises a programmable controller including operating software to determine the status of the vehicle subsystem.

6. The apparatus of claim 1 wherein the vehicle subsystem comprises an anti-lock braking system.

7. A method of communicating within a vehicle including a power bus, said vehicle including a vehicle subsystem, the method comprising:
    obtaining a data signal representing a status of the vehicle subsystem;
    producing a data-modulated signal from the data signal representing the status of the vehicle subsystem;
    transmitting the data-modulated signal using the power bus;
    receiving the data-modulated signal from the power bus to determine the status of the vehicle subsystem from said data-modulated signal; and
    indicating the status of the vehicle subsystem to an operator positioned in the vehicle.

8. The method of claim 7 wherein the vehicle is a tractor/trailer.

9. The method of claim 8 wherein the vehicle subsystem comprises an anti-lock braking system.

10. The method of claim 8 wherein the data-modulated signal is a data-modulated spread spectrum signal.

11. The method of claim 7 wherein the vehicle subsystem comprises an anti-lock braking system.

12. The method of claim 7 wherein the data-modulated signal is a data-modulated spread spectrum signal.

13. Apparatus for communicating within a vehicle including a power bus, said vehicle also including a vehicle subsystem, the apparatus comprising:
    means for obtaining a data signal representing a status of the vehicle subsystem;
    means for producing a data-modulated signal from the data signal representing the status of the vehicle subsystem;
    means for transmitting the data-modulated signal using the power bus;
    means for receiving the data-modulated signal from the power bus to determine the status of the vehicle subsystem from said data-modulated signal; and
    means for indicating the status of the vehicle subsystem to an operator positioned in the vehicle.

14. The apparatus of claim 13 wherein the vehicle is a tractor/trailer.

15. The apparatus of claim 14 wherein the vehicle subsystem comprises an anti-lock braking system.

16. The apparatus of claim 14 wherein the data-modulated signal is a data-modulated spread spectrum signal.

17. The apparatus of claim 13 wherein the vehicle subsystem comprises an anti-lock braking system.

18. The apparatus of claim 13 wherein the data-modulated signal is a data-modulated spread spectrum signal.

* * * * *